United States Patent
Watabe

(10) Patent No.: US 7,331,222 B2
(45) Date of Patent: Feb. 19, 2008

(54) RELIABLE REMOTE TIRE PRESSURE MONITORING SYSTEM WITH TIRE MONITORS OPERATING IN POWER SAVING MODE

(75) Inventor: Nobuya Watabe, Nagoya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/519,851

(22) Filed: Sep. 13, 2006

(65) Prior Publication Data

US 2007/0068240 A1    Mar. 29, 2007

(30) Foreign Application Priority Data

Sep. 13, 2005  (JP)  ............................. 2005-265236
Sep. 20, 2005  (JP)  ............................. 2005-272303

(51) Int. Cl.
  *B60C 23/02*  (2006.01)
(52) U.S. Cl. ..................................... 73/146.5; 340/447
(58) Field of Classification Search .................. 73/146, 73/146.5; 340/447, 505, 507
  See application file for complete search history.

(56) References Cited

U.S. PATENT DOCUMENTS

| 4,319,220 | A | * | 3/1982 | Pappas et al. ............... 340/447 |
| 5,602,524 | A | | 2/1997 | Mock et al. |
| 6,112,165 | A | * | 8/2000 | Uhl et al. .................... 702/138 |
| 6,259,360 | B1 | | 7/2001 | Takamura |
| 6,359,556 | B1 | | 3/2002 | Katou |
| 2002/0126005 | A1 | * | 9/2002 | Hardman et al. ........... 340/442 |
| 2004/0017291 | A1 | * | 1/2004 | Hardman et al. ........... 340/505 |
| 2006/0244581 | A1 | * | 11/2006 | Breed et al. ................. 340/447 |
| 2007/0156312 | A1 | * | 7/2007 | Breed et al. .................. 701/29 |

FOREIGN PATENT DOCUMENTS

| JP | 7-507513 | 8/1995 |
| JP | 11-334328 | 12/1999 |
| JP | 2000-99869 | 4/2000 |
| JP | 2001-105812 | 4/2001 |

* cited by examiner

*Primary Examiner*—Andre J. Allen
(74) *Attorney, Agent, or Firm*—Nixon & Vanderhye P.C.

(57) ABSTRACT

A remote tire pressure monitoring system includes a tire monitor, a receiver, a transmitter, and a controller. The tire monitor is configured to operate in a power saving mode, in which it senses inflation pressure of a tire, determines a change in the inflation pressure of the tire, and transmits a pressure transmitting signal only when the determined change in the inflation pressure is greater than or equal to a predetermined threshold. The controller is operatively connected with the receiver and the transmitter. The controller works to determine, upon receipt of the pressure transmitting signal by the receiver, the inflation pressure of the tire based on the pressure transmitting signal. The controller also works to control, in response to receipt of the pressure transmitting signal by the receiver, the transmitter to transmit the acknowledge signal to inform the tire monitor that the receiver has certainly received the pressure transmitting signal.

25 Claims, 13 Drawing Sheets

(PRESSURE HOT LINK)

(PRESSURE HOT LINK)

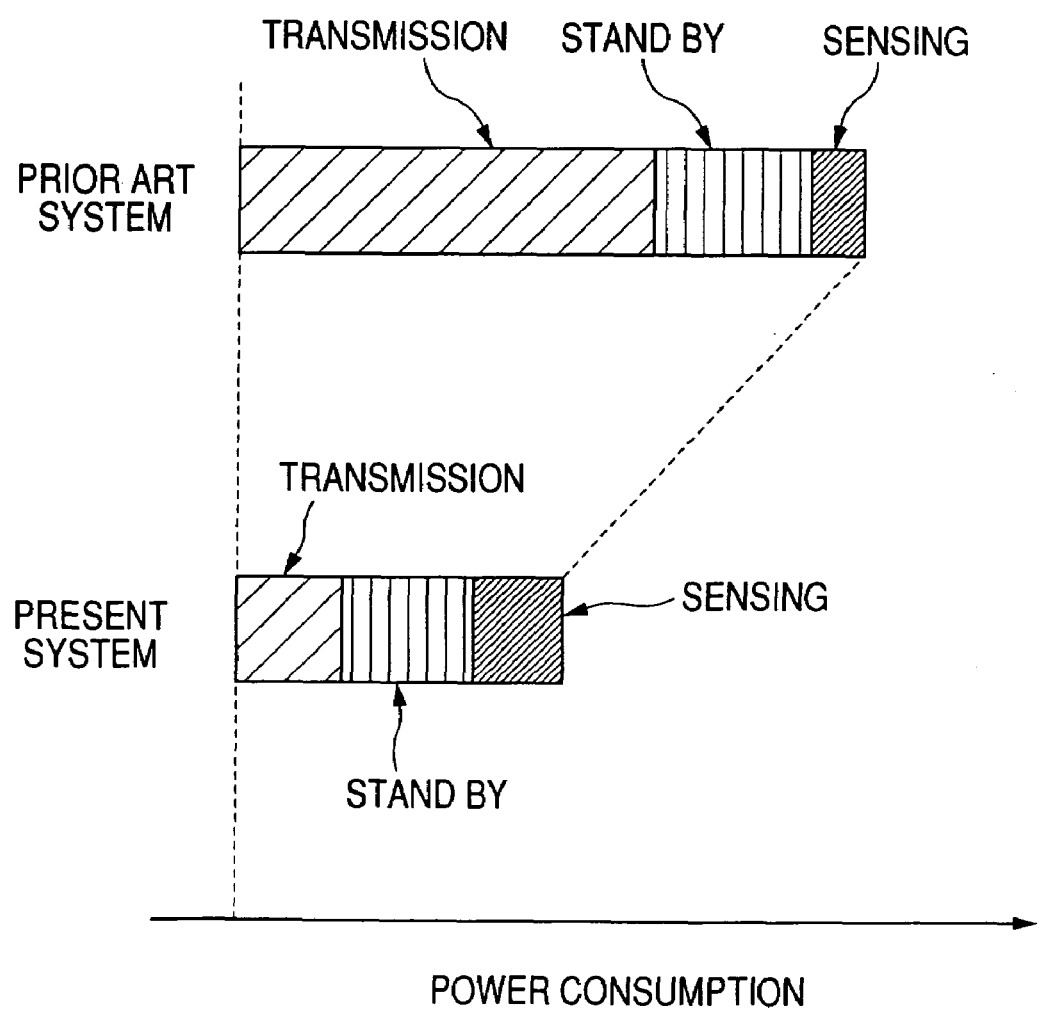

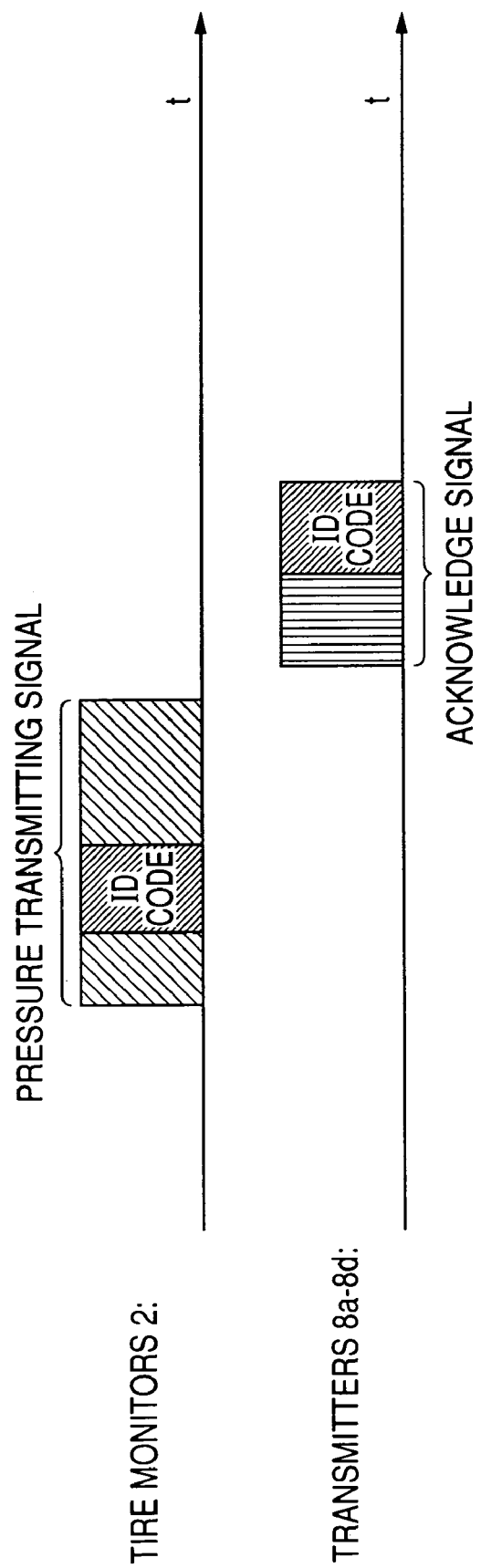

RELIABLE REMOTE TIRE PRESSURE MONITORING SYSTEM WITH TIRE MONITORS OPERATING IN POWER SAVING MODE

CROSS-REFERENCE TO RELATED APPLICATIONS

This application is based on and claims priority from Japanese Patent Applications No. 2005-265236, filed on Sep. 13, 2005, and No. 2005-272303, filed on Sep. 20, 2005, the contents of which are hereby incorporated by reference into this application.

BACKGROUND OF THE INVENTION

1. Technical Field of the Invention

The present invention relates generally to tire pressure monitoring systems for vehicles. More particularly, the invention relates to a remote tire pressure monitoring system for a vehicle, which includes a plurality of tire monitors configured to operate in a power saving mode and can provide a reliable and almost real-time monitoring of the inflation pressure of tires of the vehicle.

2. Description of the Related Art

A remote tire pressure monitoring system for a vehicle, such as disclosed in U.S. Pat. No. 5,602,524, generally includes a plurality of tire monitors and a receiver.

Each of the tire monitors is installed on one of a plurality of wheels of the vehicle and includes a pressure sensor and a transmitter. The pressure sensor works to sense the inflation pressure of a tire fitted on the wheel. The transmitter works to transmit a pressure transmitting signal that contains information on the inflation pressure of the tire sensed by the pressure sensor.

The receiver is installed on the body of the vehicle. The receiver is configured to receive the pressure transmitting signals transmitted from the tire monitors, determine the inflation pressure of the tires based on the information contained in the received pressure transmitting signals, and perform various processes based on the determined inflation pressure of the tires, such as informing the vehicle driver of the determined inflation pressure of the tires via a display device.

In such a remote tire pressure monitoring system, each of the tire monitors is generally supplied with electric power by a battery provided on the same wheel. In order to secure a long service life of the battery while decreasing the size (i.e., the capacity) of the same, it is required to decrease the power consumption of the tire monitor.

To meet the above requirement, there have been proposed three approaches.

The first approach is to decrease the power consumption of an IC (Integrated Circuit) employed in the tire monitor by advanced process technology.

However, in general, the majority of the total power consumption of the tire monitor is caused by transmission of the pressure transmitting signal, whereas only a minority of the same is caused by the IC. Therefore, even if the power consumption of the IC is ultimately minimized, this will be still not enough to decrease the total power consumption of the tire monitor to a satisfactory level.

The second approach is to reduce the number of transmissions of the pressure transmitting signal by employing a running detection device (e.g., an acceleration sensor). Specifically, the running detection device is employed to provide the tire monitor with information on whether the vehicle is running or at a standstill; thus, the tire monitor can transmit the pressure transmitting signal only when the vehicle is running, thereby reducing the number of transmissions of the pressure transmitting signal.

However, to timely provide the receiver with the information on the inflation pressure of the tire, it is desirable for the tire monitor to periodically transmit the pressure transmitting signal at sufficiently short time intervals when the vehicle is running. Thus, with the second approach, there is a limitation to reduce the number of transmissions of the pressure transmitting signal and thus a limitation to decrease the power consumption of the tire monitor.

The third approach is to reduce the number of transmissions of the transmitting signal by employing a triggering device. Specifically, the triggering device is installed on the body of the vehicle and works to transmit a trigger signal; the tire monitor further includes a receiver to receive the trigger signal. When the receiver requires the information on the inflation pressure of the tire, the receiver controls the triggering device to transmit the trigger signal, which triggers the transmitter of the tire monitor to transmit the pressure transmitting signal.

Since the pressure transmitting signal is transmitted only when the receiver requires the information on the inflation pressure of the tire, the number of transmissions of the pressure transmitting signal can be significantly reduced, thus decreasing the power consumption of the tire monitor to a satisfactory level.

However, with the third approach, it is impossible to achieve a real-time monitoring of the inflation pressure of the tire. Specifically, according to the third approach, transmission times, at which the transmitter of the tire monitor transmits the pressure transmitting signal, are determined by the receiver, not by the tire monitor. Therefore, when a notable change in the inflation pressure of the tire occurs during the time interval between any two successive transmission times determined by the receiver, the change in the inflation pressure of the tire cannot be immediately communicated to the receiver. Such a time lag in communicating the change in the inflation pressure of the tire to the receiver may result in a delay in taking a suitable measure against the change.

SUMMARY OF THE INVENTION

The present invention has been made in view of the above-mentioned problems.

It is, therefore, an object of the present invention to provide a remote tire pressure monitoring system for a vehicle, which includes tire monitors consuming much less power than tire monitors of existing remote tire pressure monitoring systems.

It is another object of the present invention to provide a remote tire pressure monitoring system for a vehicle, which can provide a reliable and almost real-time monitoring of the inflation pressure of tires of the vehicle.

To achieve the above objects, the inventor of the present invention has first investigated different patterns of change in the inflation pressure of a vehicle tire.

The first pattern is a rapid change caused by, for example, a tire blowout; the second pattern is a slow change caused by the natural air loss; the third pattern is a temporary change caused by a temporary change in the air temperature within the tire when the vehicle is running.

During almost the whole service life of a vehicle tire, only the second pattern of change takes place in the inflation pressure of the tire; the third pattern takes place only for a small minority of the service life; and the first pattern rarely occurs.

In view of the above, the inventor has considered that it is not necessary for a tire monitor of a remote tire pressure monitoring system to transmit the pressure transmitting signal representative of the inflation pressure of the tire unless there is a rapid change in the inflation pressure of the tire.

Specifically, according to the consideration of the inventor, the tire monitor may be configured such that: it transmits the pressure transmitting signal once immediately after the ignition switch of the vehicle is turned on, so that a receiver of the remote tire pressure monitoring system can determine an initial value of the inflation pressure of the tire upon receipt of the pressure transmitting signal; after that, it transmits the pressure transmitting signal only when there is a rapid change in the inflation pressure of the tire.

In other words, with such a configuration, the tire monitor will not transmit the pressure transmitting signal when only the second pattern of change takes place in the inflation pressure of the tire. Consequently, the number of transmissions of the pressure transmitting signal will be significantly reduced, thus decreasing the power consumption of the tire monitor to a satisfactory level.

Further, when there is no pressure transmitting signal transmitted from the tire monitor, the receiver recognizes that there is no rapid change in the inflation pressure of the tire, in other words, the inflation pressure of the tire almost remains unchanged. On the contrary, when a rapid change occurs in the inflation pressure of the tire, the tire monitor immediately transmits the pressure transmitting signal, so that the receiver can be timely apprised of the change in the inflation pressure of the tire.

Furthermore, during the rapid change in the inflation pressure of the tire, the tire monitor may cyclically transmit the pressure transmitting signal at shorter time intervals (e.g. 1s), without significantly increasing the total number of transmissions of the pressure transmitting signal.

Consequently, with the above configuration, it will be possible for the tire monitor to provide the information on the inflation pressure of the tire to the receiver in an almost real-time manner.

Moreover, to secure a high reliability in providing the information on the inflation pressure of the tire to the receiver, the remote tire pressure monitoring system may be further configured such that: the receiver transmits an acknowledge signal in repose to receipt of the pressure transmitting signal; upon receipt of the acknowledge signal, the tire monitor recognizes that the pressure transmitting signal transmitted thereby has certainly been received by the receiver.

In general, a link between two different devices (or applications) is referred to as a hot link, if data in one of the devices are automatically updated with a data update in the other.

Accordingly, with the above configuration, it will be possible to establish a reliable "pressure hot link" between the tire monitor and the receiver.

The present invention is derived from the above consideration of the inventor.

According to the present invention, there is provided a remote tire pressure monitoring system which includes a tire monitor, a receiver, a transmitter, and a controller.

The tire monitor is provided on a wheel of a vehicle. The tire monitor is configured to operate in a power saving mode, in which the tire monitor senses inflation pressure of a tire fitted on the wheel, determines a change in the inflation pressure of the tire, and transmits a pressure transmitting signal containing information on the sensed inflation pressure of the tire only when the determined change in the inflation pressure of the tire is greater than or equal to a predetermined threshold.

The receiver works to receive the pressure transmitting signal transmitted by the tire monitor.

The transmitter works to transmit an acknowledge signal.

The controller is operatively connected with the receiver and the transmitter. The controller works to determine, upon receipt of the pressure transmitting signal by the receiver, the inflation pressure of the tire based on the information contained in the pressure transmitting signal. The controller also works to control, in response to receipt of the pressure transmitting signal by the receiver, the transmitter to transmit the acknowledge signal to inform the tire monitor that the receiver has received the pressure transmitting signal.

With the above configuration, it is possible to significantly reduce the number of transmissions of the pressure transmitting signal, thereby remarkably decreasing the power consumption of the tire monitor.

Further, when there is a notable change in the inflation pressure of the tire, the change can be immediately communicated to the controller, thereby making it possible to achieve an almost real-time monitoring of the inflation pressure of the tire.

Furthermore, using the acknowledge signal, it is possible to secure a high reliability in providing the information on the inflation pressure of the tire from the tire monitor to the controller.

Accordingly, with the above configuration, it is possible to establish a reliable pressure hot link between the tire monitor and the controller while significantly decreasing the power consumption of the tire monitor.

Preferably, in the power saving mode, the tire monitor further senses air temperature within the tire, determines a change in the air temperature within the tire, and transmits the pressure transmitting signal only when the determined change in the inflation pressure of the tire is greater than or equal to the predetermined threshold and the determined change in the air temperature within the tire is less than a second predetermined threshold.

With this configuration, it is possible to prevent unnecessary transmission of the pressure transmitting signal by the tire monitor when the change in the inflation pressure of the tire is not caused by a rapid change in the amount of air within tire, thus avoiding waste of power.

It is also preferable that in the power saving mode, if the tire monitor has not received the acknowledge signal from the transmitter for a predetermined time period after the transmission of the pressure transmitting signal, the tire monitor retransmits the pressure transmitting signal.

With this configuration, it is possible to increase the probability of the pressure transmitting signal being received by the receiver.

It is further preferable that in the power saving mode, if the tire monitor has not received the acknowledge signal from the transmitter after a predetermined number of retransmissions of the pressure transmitting signal, the tire monitor shifts the operation thereof from the power saving mode to a periodic transmission mode, in which the tire monitor periodically transmits the pressure transmitting signal at predetermined time intervals.

With this configuration, it is possible to keep the tire pressure monitoring level of the system at least the same as those of conventional remote tire pressure monitoring systems when the tire monitor cannot receive the acknowledge signal due to a malfunction of the transmitter or environmental noises.

Further, it is preferable that in the periodic transmission mode, the tire monitor periodically senses the inflation pressure of the tire at the same predetermined time intervals as periodically transmits the pressure transmitting signal.

With this configuration, it is possible to decrease the power consumption of the tire monitor for sensing of the inflation pressure of the tire.

It is preferable that in the periodic transmission mode, if the tire monitor receives the acknowledge signal transmitted by the transmitter, the tire monitor shifts the operation thereof from the periodic transmission mode to the power saving mode.

With this configuration, it is possible to restore the pressure hot link between the tire monitor and the controller as soon as the tire monitor comes to receive the acknowledge signal.

It is also preferable that in the power saving mode, the tire monitor cyclically transmits the pressure transmitting signal, when the determined change in the inflation pressure of the tire is greater than or equal to the predetermined threshold, at shorter predetermined time intervals than in the periodic transmission mode.

With this configuration, it is possible to communicate the change in the inflation pressure of the tire to the controller in a more timely manner.

When the remote tire pressure monitoring system further includes a spare tire monitor mounted to a spare tire of the vehicle, it is preferable that the spare tire monitor is so located on the vehicle that the spare tire monitor cannot receive the acknowledge signal transmitted by the transmitter.

With this configuration, it is possible to avoid any mistriggering of the spare tire monitor by the acknowledge signal.

Further, the spare tire monitor is preferably configured to operate in a long-period periodic transmission mode, in which the spare tire monitor senses inflation pressure of the spare tire and periodically transmits a pressure transmitting signal containing information on the sensed inflation pressure of the spare tire at longer predetermined time intervals than the tire monitor periodically transmits the pressure transmitting signal containing information on the inflation pressure of the tire in the periodic transmission mode.

With this configuration, it is possible to reliably monitor the inflation pressure of the spare tire while suppressing the power consumption of the spare tire monitor.

It is also preferable that in the periodic transmission mode, if the tire monitor has not received the acknowledge signal from the transmitter for a predetermined time period, the tire monitor shifts the operation thereof from the periodic transmission mode to the long-period periodic transmission mode in which the spare tire monitor operates.

With this configuration, it is possible to reduce the number of transmissions of the pressure transmitting signal when the tire monitor cannot receive in the periodic transmission mode the acknowledge signal due to a malfunction of the transmitter or environmental noises.

The remote tire pressure monitoring system may further include a running detector that is operatively connected to the tire monitor and works to detect if the vehicle is running or at a standstill. In this case, it is preferable that when the running detector detects the vehicle being at a standstill, the tire monitor operates in the long-period periodic transmission mode, in which the spare tire monitor operates, and the operation of the tire monitor is inhibited from being shifted from the long-period periodic transmission mode to the power saving mode or to the periodic transmission mode until the running detector detects the vehicle running.

With this configuration, it is possible to prevent the tire monitor from being mistriggered by foreign signals to operate in either of the power saving mode or the periodic transmission mode when the vehicle is not running, thus avoiding waste of power.

According to a further implementation of the present invention, in the remote tire pressure monitoring system, the pressure transmitting signal transmitted by the tire monitor further contains a specific code, in response to receipt of the pressure transmitting signal by the receiver, the controller generates an acknowledge code based on the specific code contained in the pressure transmitting signal and controls the transmitter to transmit the acknowledge signal that contains the generated acknowledge code, and upon receipt of the acknowledge signal, the tire monitor recognizes, based on the acknowledge code contained in the acknowledge signal, that the pressure transmitting signal transmitted thereby has certainly been received by the receiver.

With the above configuration, it is possible for the tire monitor to accurately determine, without using a vehicle identification code unique to the vehicle, whether the pressure transmitting signal transmitted thereby has been received by the receiver.

Consequently, it becomes possible to enhance the reliability of the remote tire pressure monitoring system without increasing the manufacturing cost of the same.

Further, in the remote tire pressure monitoring system, the specific code contained in the pressure transmitting signal may be an identification code unique to the tire monitor. In this case, the controller may generate the acknowledge code as being identical to the whole or part of the identification code. The controller may also generate the acknowledge code by using an operational expression that defines a definite relationship between the acknowledge code and the whole or part of the identification code.

Otherwise, the specific code contained in the pressure transmitting signal may be a random bit string. In this case, the controller may generate the acknowledge code as being identical to the whole or part of the random bit string. The controller may also generate the acknowledge code by using an operational expression that defines a definite relationship between the acknowledge code and the whole or part of the random bit string.

The controller may also generate the acknowledge code as being an error-correcting code of the specific code contained in the pressure transmitting signal.

In addition, in the remote tire pressure monitoring system, all of the receiver, the transmitter, and the controller may be provided on a body of the vehicle. Further, the receiver and the controller may be integrated into a single device.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 9 is a graphical representation giving a comparison between the power consumption of each of the tire monitors in the remote tire pressure monitoring system of FIG. 1 and that in the second prior art remote tire pressure monitoring system;

FIG. 13 is a time chart illustrating the relation between transmission of a pressure transmitting signal and transmission of an acknowledge signal in response to receipt of the pressure transmitting signal by the receiver.

DESCRIPTION OF THE PREFERRED EMBODIMENTS

Figure 1:
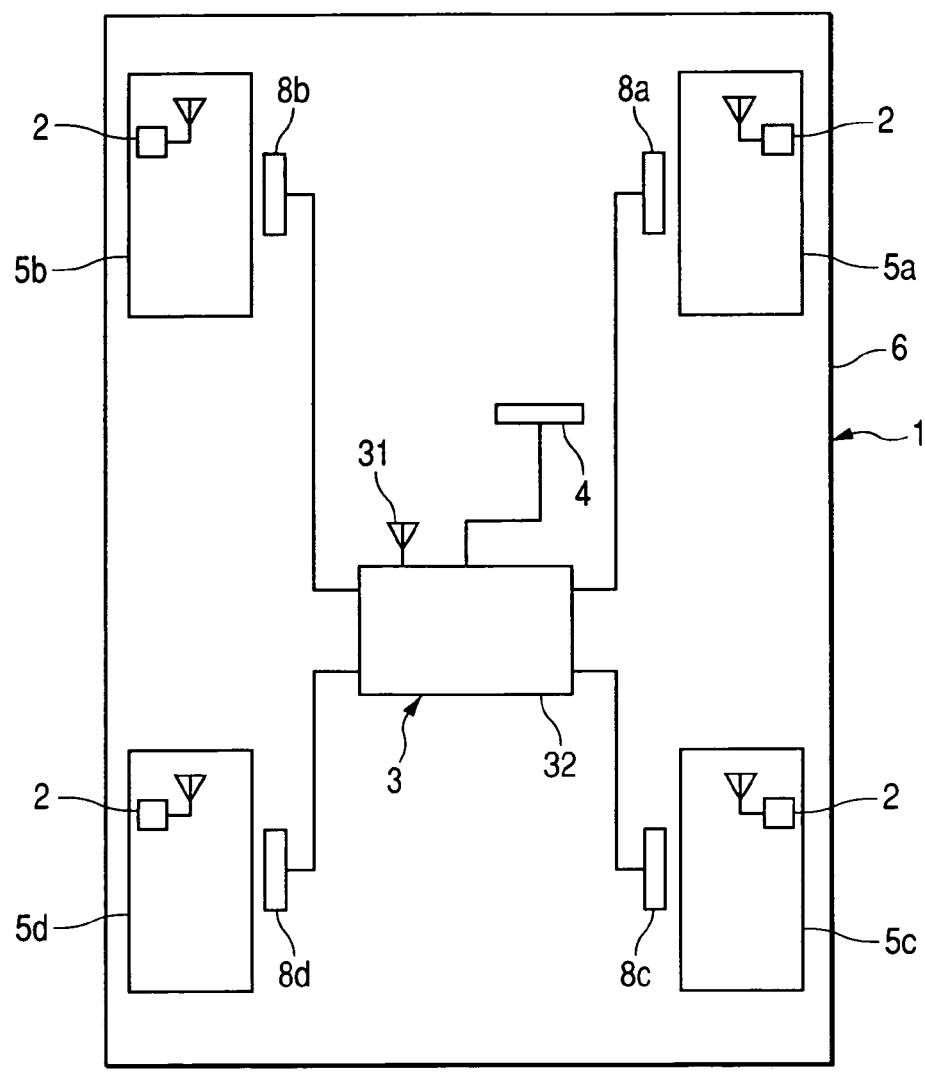
FIG. 1 is a schematic view showing the overall configuration of a remote tire pressure monitoring system according to the first embodiment of the invention.

The preferred embodiments of the present invention will be described hereinafter with reference to FIGS. 1-13.

It should be noted that, for the sake of clarity and understanding, identical components having identical functions in different embodiments of the invention have been marked, where possible, with the same reference numerals in each of the figures.

First Embodiment

FIG. 1 shows the overall configuration of a remote tire pressure monitoring system S1 according to the first embodiment of the invention.

The remote tire pressure monitoring system S1 is installed to a vehicle 1 and configured to monitor the inflation pressure of four tires each of which is fitted on one of four wheels 5a-5d of the vehicle 1 (i.e., the front-right wheel 5a, the front-left wheel 5b, the rear-right wheel 5c, and the rear-left wheel 5d).

It should be noted that the vehicle 1 may have a different number of tires. For example, the vehicle 1 may have a spare tire (not shown), and the remote tire pressure monitoring system S1 is accordingly configured to monitor the inflation pressure of the five tires.

As shown in FIG. 1, the remote tire pressure monitoring system S1 includes four tire monitors 2, a receiver 3, a warning device 4, and four transmitters 8a-8d.

Each of the tire monitors 2 is mounted on one of the four wheels 5a-5d of the vehicle 1 and works to sense the inflation pressure of the tire fitted on the corresponding wheel and transmit a pressure transmitting signal containing information on the sensed inflation pressure of the tire.

On the other hand, the receiver 3 is mounted on the body 6 of the vehicle 1 and works to receive the pressure transmitting signals transmitted by the tire monitors 2 and determine the inflation pressure of the four tires based on the information contained in the received pressure transmitting signals. The receiver 3 also works to control the transmitters 8a-8d, which are also mounted on the body 6 of the vehicle 1, to transmit various signals to the tire monitors 2. For example, in response to receipt of the pressure transmitting signal transmitted by each of the tire monitors 2, the receiver 3 controls a corresponding one of the transmitters 8a-8d to transmit an acknowledge signal to inform the tire monitor 2 of receipt of the pressure transmitting signal.

Figure 2A:
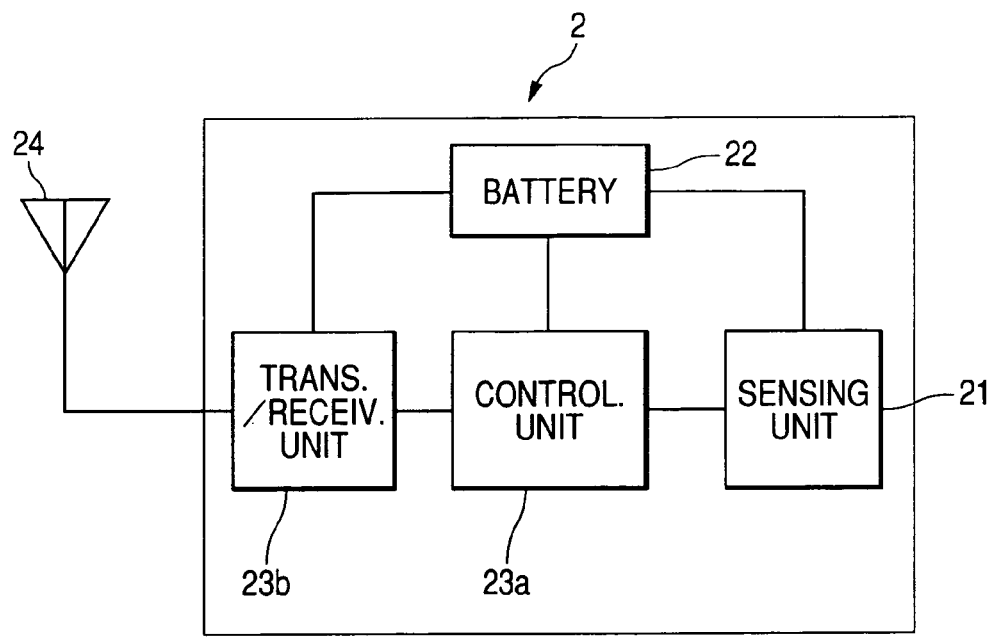
FIG. 2A is a functional block diagram showing the configuration of each of tire monitors in the remote tire pressure monitoring system of FIG. 1.

Referring to FIG. 2A, each of the tire monitors 2 functionally includes a sensing unit 21, a battery 22, a controlling unit 23a, a transmitting/receiving unit 23b, and an antenna 24.

The sensing unit 21 is configured with sensors, such as a diaphragm-type pressure sensor and a temperature sensor, and works to output sensing signals representative of the sensed inflation pressure of the tire and the sensed air temperature within the tire.

The battery 22 is provided to supply electrical power necessary for operation of the tire monitor 2.

The controlling unit 23a is configured with a CPU, a ROM, a RAM, and I/O devices. The controlling unit 23a works to implement predetermined processes in accordance with a program installed in the ROM. In addition, in the ROM, there is also stored an identification code which is unique to the tire monitor 2 and thus represents the identity of the tire monitor 2.

Specifically, the controlling unit 23a receives the sensing signals outputted from the sensing unit 21 and cyclically determines, at predetermined time intervals, the inflation pressure of the tire based on the sensing signals. Then, the controlling unit 23a assembles a frame, which contains information on the determined inflation pressure of the tire and the identification code unique to the tire monitor 2, and provides the frame to the transmitting/receiving unit 23b if necessary.

More specifically, the controlling unit 23a processes the sensing signals outputted from the sensing unit 21 and cyclically determines, at the predetermined time intervals, both the inflation pressure of the tire and the air temperature within the tire based on the processed sensing signals. The controlling unit 23a may correct the determined inflation pressure of the tire based on the determined air temperature within the tire; in this case, the information contained in the frame represents the corrected inflation pressure of the tire. Otherwise, the information contained in the frame represents both the uncorrected inflation pressure of the tire and the air temperature within the tire. The process of providing the frame to the transmitting/receiving unit 23b is performed in accordance with the program installed in the ROM.

In addition, the controlling unit 23a performs various different processes in different operation modes of the tire monitor 2, which are to be described in detail later.

The transmitting/receiving unit 23b works to receive the frame provided by the controlling unit 23a, modulate the frame into the pressure transmitting signal, and transmit the pressure transmitting signal via the antenna 24; it also works to receive via the antenna 24 signals transmitted by the corresponding one of the transmitters 8a-8d, such as the acknowledge signal, and provide the received signals to the controlling unit 23a.

The antenna 24 functions as both a transmitting antenna for transmitting the pressure transmitting signal and a receiving antenna for receiving signals transmitted from the corresponding one of the transmitters 8a-8d.

Additionally, though the tire monitor 2 is configured to include only the single antenna 24 in the present embodiment, it may also be configured to include two antennas, one for transmitting and the other for receiving.

Each of the above-described tire monitors 2 is fixed to an air valve of a corresponding one of the wheels 5a-5d such that at least the sensing unit 21 thereof is placed inside the tire to be exposed to the air within the tire.

Figure 2B:
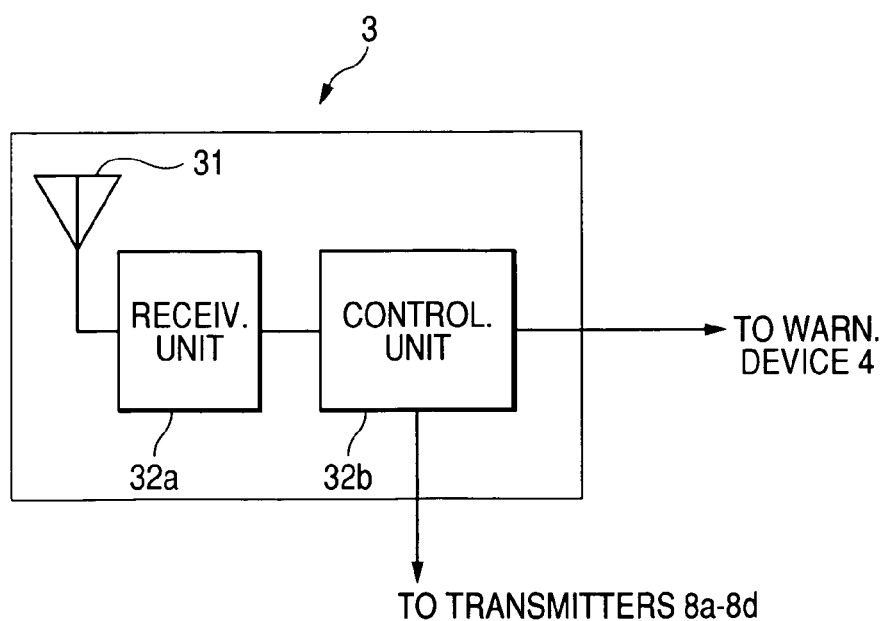
FIG. 2B is a functional block diagram showing the configuration of a receiver in the remote tire pressure monitoring system of FIG. 1.

Referring now to FIG. 2B, the receiver 3 is configured with a receiving antenna 31, a receiving unit 32a, and a controlling unit 32b. In addition, as shown in FIG. 2B and FIG. 1, the receiver 3 is operatively connected to each of the transmitters 8a-8d.

The receiving antenna 31 works to receive all the pressure transmitting signals transmitted by the tire monitors 2.

The receiving unit 32a works to demodulate the pressure transmitting signals received via the receiving antenna 31 and provide the demodulated signals to the controlling unit 32b.

The controlling unit 32b is configured with a CPU, a ROM, a RAM, and I/O devices. The controlling unit 32b works to implement predetermined processes in accordance with a program installed in the ROM thereof.

Specifically, the controlling unit 32b identifies, for each of the demodulated pressure transmitting signals provided from the receiving unit 32a, the wheel on which the tire monitor 2 having transmitted the pressure transmitting signal is mounted, based on the identification code contained in the demodulated pressure transmitting signal.

More specifically, the controlling unit 32b has stored in the RAM thereof reference identification codes, each of which coincides with the identification code of one of the tire monitors 2 and is associated with the location of the one of the tire monitors 2 on the vehicle 1 (i.e., the wheel on which the one of the tire monitors 2 is mounted). Thus, the controlling unit 32 can identify, for each of the demodulated pressure transmitting signals provided from the receiving unit 32a, the wheel on which the tire monitor 2 having transmitted the pressure transmitting signal is mounted, through matching the identification code contained in the demodulated pressure transmitting signal and a coincident one of the reference identification codes stored in the RAM.

The controlling unit 32b further determines, for each of the demodulated pressure transmitting signal provided from the receiving unit 32a, the inflation pressure of the tire that is fitted on the same wheel as the tire monitor 2 having transmitted the pressure transmitting signal, based on the information contained in the demodulated pressure transmitting signal.

When the determined inflation pressure of the tire is lower than a predetermined lower limit P-low, the controlling unit 32b outputs a warning signal, which represents both the inflation pressure and location of the tire, to the warning device 4.

Moreover, in response to each receipt of the pressure transmitting signals by the receiving unit 32a, the controlling unit 32b controls the one of the transmitters 8a-8d, which corresponds to the tire monitor 2 having transmitted the received pressure transmitting signal, to transmit the acknowledge signal. Thus, the tire monitor 2 can be appraised, upon receipt of the acknowledge signal, that the pressure transmitting signal transmitted thereby has been received by the receiver 3.

In addition, in the present embodiment, the acknowledge signal is so predetermined to be recognizable by each of the tire monitors 2.

Further, the controlling unit 32b controls each of the transmitters 8a-8d to transmit a trigger signal when the ignition switch of the vehicle 1 is turned from off to on. The trigger signal represents a request for a corresponding one of the tire monitors 2 to transmit the pressure transmitting signal. In other words, the trigger signal will trigger the corresponding one of the tire monitors 2 to transmit the pressure transmitting signal.

The warning device 4 is, as illustrated in FIG. 1, electrically connected to the receiver 3 and arranged at a location visible for the driver of the vehicle 1. The warning device 4 is configured with, for example, a warning display on the instrument panel of the vehicle 1. The warning device 4 works to inform, in response to receipt of the warning signal from the receiver 3, the driver of both the decreased inflation pressure and location of the tire.

Each of the transmitters 8a-8d is mounted on the body 6 of the vehicle 1 at a location corresponding to one of the four tire monitors 2. More specifically, each of the transmitters 8a-8d is located away from the corresponding one of the tire monitors 2 by a given distance. The given distance is so set as to allow the tire monitors 2 to reliably receive signals transmitted by the corresponding transmitters 8a-8d.

Each of the transmitters 8a-8d works to transmit, under control of the controlling unit 32b of the receiver 3, various signals including the trigger signal and the acknowledge signal described above.

In addition, though the receiver 3 is configured to include only the single receiving antenna 31 in the present embodiment, it may also be configured to include four antennas 31, each of which corresponds to one of the tire monitors 2. Further, each of the four receiving antennas 31 may be integrated into a corresponding one of the transmitters 8a-8d.

After having described the overall configuration of the remote tire pressure monitoring system S1, operation thereof will be described hereinafter.

Figure 3:
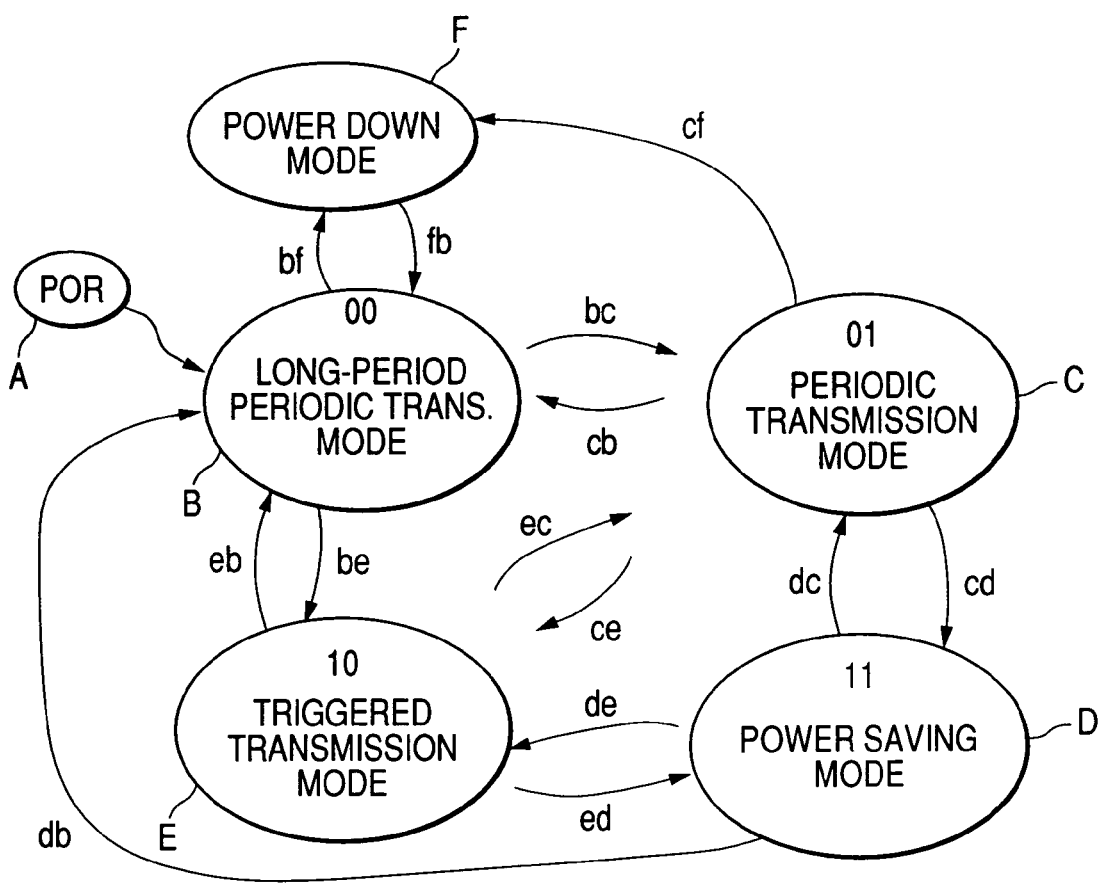
FIG. 3 is a state transition diagram illustrating transitions among different operation modes of each of the tire monitors in the remote tire pressure monitoring system of FIG. 1.

Referring to FIG. 3, in the remote tire pressure monitoring system S1, each of the tire monitors 2 is configured to have a plurality of operation modes.

Specifically, after a Power-On Reset (POR) is made, as indicated by A in FIG. 3, the operation of each of the tire monitors 2 is shifted to various modes, including a long-period periodic transmission mode (indicated by B), a periodic transmission mode (indicated by C), a power saving mode (indicated by D), a triggered transmission mode (indicated by E), and a power down mode (indicated by F).

During operation of each of the tire monitors 2, the controlling unit 23a assembles into the pressure transmitting signal a mode code that indicates the present operation mode of the tire monitor 2.

In the present embodiment, the mode code is represented by 2-bit data. Fore example, as shown in FIG. 3, the long-period periodic transmission mode is represented by "00", the periodic transmission mode is represented by "01", the power saving mode is represented by "11", and the triggered transmission mode is represented by "10".

Based on the mode code contained in the received pressure transmitting signal, the receiver 3 identifies the operation mode in which the tire monitor 2 is currently operating, and controls, if necessary, the corresponding one of the transmitters 8a-8d to transmit a shift command signal that represents a command for the tire monitor 2 to shift the operation thereof from the present mode to another.

The operation modes of the tire monitors 2 are described in detail hereinbelow.

1) Long-period Periodic Transmission Mode

When the POR is made, the operation of each of the tire monitors 2 first enters the long-period periodic transmission mode.

In this operation mode, each of the tire monitors 2 periodically transmits the pressure transmitting signal at long predetermined time intervals (e.g., 1 hour).

Additionally, in case that the vehicle 1 further includes a spare tire and the remote tire pressure monitoring system S1 further includes a fifth tire monitor 2 mounted to the spare tire, the fifth tire monitor 2 normally operates in the long-period periodic transmission mode. The receiver 3 receives the pressure transmitting signal transmitted by the fifth tire monitor 2 and determines the inflation pressure of the spare tire based on the information contained in the received pressure transmitting signal.

Since the spare tire is not fitted on a running wheel of the vehicle 1, only a slow change in the inflation pressure of the spare tire is caused by the natural air loss. Therefore, it is possible to reliably monitor the inflation pressure of the spare tire with the long time intervals set for the long-period periodic transmission mode.

Further, it is desirable to avoid any interference at the receiver 3 between the pressure transmitting signal transmitted by the fifth tire monitor 2 and that transmitted by any of the tire monitors 2 on the wheels 5a-5d. Accordingly, the spare tire is preferably located on the body 6 of the vehicle 1 such that the fifth tire monitor 2 cannot receive signals transmitted by the transmitters 8a-8d, thus avoiding any mistriggering of the fifth tire monitor 2.

For example, the fifth tire monitor 2 may be preferably located much more away from the transmitters 8a-8d than the corresponding tire monitors 2 on the wheels 5a-5d. Otherwise, it may be preferably shielded from signals transmitted by the transmitters 8a-8d.

2) Periodic Transmission Mode

The operation of each of the tire monitors 2 is shifted from the long-period periodic transmission mode to the periodic transmission mode, as indicated by a line bc in FIG. 3, if the tire monitor 2 receives in the long-period periodic transmission mode the shift command signal from the receiver 3. The shift command signal represents, in this case, a command for the tire monitor 2 to shift the operation thereof from the long-period periodic transmission mode to the periodic transmission mode.

In addition, each of the tire monitors 2 may be configured to further include a running detection device (e.g., an acceleration sensor) that works to detect whether the vehicle 1 is running or at a standstill. In this case, the operation of each of the tire monitors 2 is shifted from the long-period periodic transmission mode to the periodic transmission mode if the running detection device detects the vehicle 1 running.

On the other hand, the operation of each of the tire monitors 2 is shifted from the power saving mode to the periodic transmission mode, as indicated by a line dc in FIG. 3, if the tire monitor 2 cannot receive the acknowledge signal due to a malfunction of the corresponding one of the transmitters 8a-8d or due to environmental noises.

The periodic transmission mode is provided for the purpose of keeping the tire pressure monitoring level of the system S1 at least the same as those of conventional systems when each of the tire monitors 2 cannot receive the acknowledge signal.

In the periodic transmission mode, each of the tire monitors 2 periodically transmits the pressure transmitting signal at shorter predetermined time intervals than in the long-period periodic transmission mode.

For example, in the periodic transmission mode, the predetermined time intervals are set to 15 s when the change in the inflation pressure of the tire is rapid and to 1 minute otherwise.

In addition, in the periodic transmission mode, it is not necessary for each of the tire monitors 2 to cyclically determine the inflation pressure of the tire at shorter time intervals than transmit the pressure transmitting signal. Accordingly, in order to save power, in the present embodiment, each of the tire monitors 2 is configured to periodically determine the inflation pressure of the tire at the same time intervals as periodically transmit the pressure transmitting signal in the periodic transmission mode.

3) Power Saving Mode

The operation of each of the tire monitors 2 is shifted from the periodic transmission mode to the power saving mode, as indicated by a line cd in FIG. 3, if the tire monitor 2 receives in the periodic transmission mode the shift command signal from the receiver 3. The shift command signal represents, in this case, a command for the tire monitor 2 to shift the operation thereof from the periodic transmission mode to the power saving mode.

The operation of each of the tire monitors 2 is also shifted from the periodic transmission mode to the power saving mode if the tire monitor 2 receives in the periodic transmission mode the acknowledge signal. More specifically, the receiver 3 receives the pressure transmitting signal that is transmitted by the tire monitor 2 in the periodic transmission mode; in response to receipt of the pressure transmitting signal, the receiver 3 controls the corresponding one of the transmitters 8a-8d to transmit the acknowledge signal; upon receipt of the acknowledge signal, the tire monitor 2 is apprised that the pressure transmitting signal transmitted thereby has been received by the receiver 3; then, in response to receipt of the acknowledge signal, the tire monitor 2 shifts the operation thereof from the periodic transmission mode to the power saving mode.

In the power saving mode, each of the tire monitors 2 cyclically determines both the inflation pressure of the tire and a change in the inflation pressure of the tire. However, each of the tire monitors 2 transmits the pressure transmitting signal containing the information on the determined inflation pressure of the tire only when the determined change in the inflation pressure of the tire is greater than or equal to a predetermined threshold.

More specifically, when the change in inflation pressure of the tire is less than the predetermined threshold, each of the tire monitors 2 stops transmission of the pressure transmitting signals, thereby saving power. Otherwise, when the change in the inflation pressure of the tire is greater than or equal to the predetermined threshold, each of the tire monitors 2 cyclically transmits the pressure transmitting signal at shorter time intervals than in the periodic transmission mode, for example at time intervals of 1 s, thereby timely communicating the change in the inflation pressure of the tire to the receiver 3.

4) Triggered Transmission Mode

The operation of each of the tire monitors 2 is shifted to the triggered transmission mode, as indicated by lines be, ce, and de in FIG. 3, if the tire monitor 2 receives, in any of the long-period periodic transmission mode, the periodic transmission mode, and the power saving mode, the trigger signal transmitted by the corresponding one of the transmitters 8a-8d.

In the triggered transmission mode, each of the tire monitors 2 transmits once the pressure transmitting signal in response to receipt of the trigger signal; then, the operation thereof is shifted back from the triggered transmission mode to the former mode, as indicated by lines eb, ec, and ed.

The triggered transmission mode is provided for the purpose of allowing the receiver 3 to timely receive the pressure transmitting signals transmitted from the tire monitors 2 whenever it requires the information on the inflation pressure of the tires.

5) Power Down Mode

The operation of each of the tire monitors 2 is shifted to the power down mode, as indicated by lines bf and cf in FIG. 3, if the tire monitor 2 receives, in either of the long-period periodic transmission mode or the periodic transmission mode, a power down command signal that represents a command for the tire monitor 2 to power down.

The power down command signal is applied to each of the tire monitors 2 by using a special device before delivery of the vehicle 1. In the power down mode, each of the tire monitors 2 stops any signal transmission.

The operation of each of the tire monitors 2 is shifted from the power down mode to the long-period periodic transmission mode, as indicated by a line fb in FIG. 3, if the tire monitor 2 receives in the power down mode an activation signal.

The activation signal is applied to each of the tire monitors 2 for performing an identification registration task as one of delivery processes for the vehicle 1.

As above, in the remote tire pressure monitoring system S1, each of the tire monitors 2 is configured to have the plurality of operation modes and to perform, in each of the operation modes, processes specified for that operation mode.

Additionally, as described previously, in case that the vehicle 1 further includes a spare tire, the fifth tire monitor 2 mounted to the spare tire normally operates in the long-period periodic transmission mode. However, if the fifth tire monitor 2 accidentally receives a shift command signal transmitted from another vehicle, the operation of the fifth tire monitor 2 may be shifted to the periodic transmission mode or to the power saving mode. The operation of the fifth tire monitor 2 in either of the periodic transmission mode or in the power saving mode is undesirable in terms of power saving.

Accordingly, each of the tire monitors 2, including the fifth tire monitor 2, is configured such that the operation thereof is shifted to the long-period periodic transmission mode, as indicated by a line cb, if it has not received any signal for a predetermined time period. Otherwise, each of the tire monitors 2 may further include a running detection device and be configured such that the operation thereof is shifted to the long-period periodic transmission mode, as indicated by lines cb and db in FIG. 3, if the running detection device cannot detect, for a predetermined time period, the vehicle 1 running.

Figure 4:
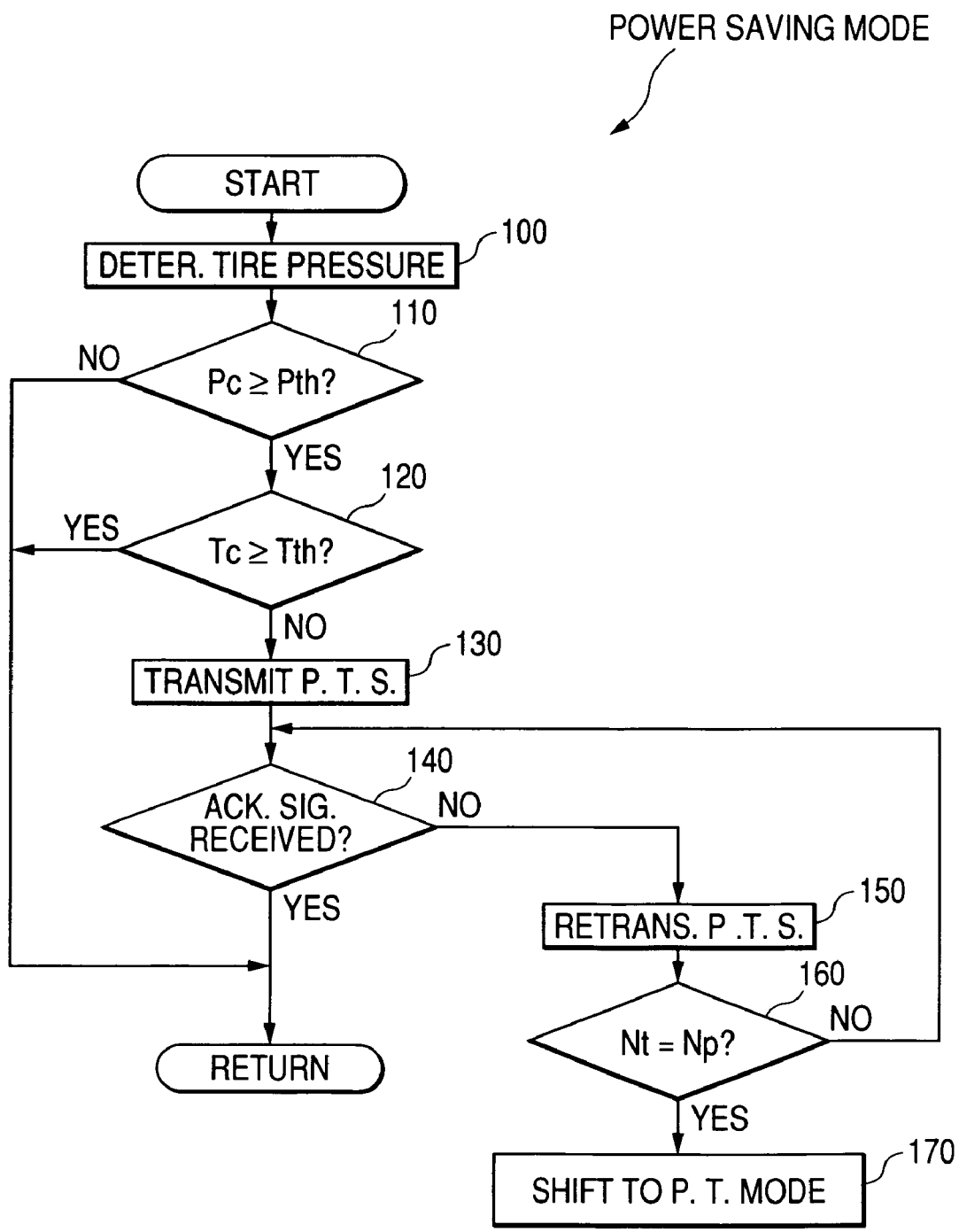
FIG. 4 is a flowchart showing a process of each of the tire monitors during the operation thereof in a power saving mode according to the first embodiment of the invention.

FIG. 4 shows the process of each of the tire monitors 2 during the operation thereof in the power saving mode. This process is repeatedly performed by the controlling unit 23a of each of the tire monitors 2.

First, at the step 100, the controlling unit 23a determines the inflation pressure of the tire based on the sensing signals outputted from the sensing unit 21.

At the step 110, the controlling unit 23a makes a determination as to whether there is a rapid change in the inflation pressure of the tire. More specifically, the controlling unit 23a determines whether the change (denoted by Pc in FIG. 4) in the inflation pressure of the tire is greater than or equal to the predetermined threshold (denoted by Pth).

In the present embodiment, the change in the inflation pressure of the tire is represented by the difference between the inflation pressure determined in the present cycle and that determined in the immediately preceding cycle. On the other hand, the threshold is predetermined in consideration of different patterns of change as well as the precision of the pressure sensor included in the sensing unit 21. For example, in the case of a tire blowout, the inflation pressure of the tire decreases by 20 kPa within 15 s. The threshold can be set to an intermediate value between the decease in the inflation pressure of the tire due to a blowout and the decrease in the inflation pressure of the tire due to the natural air loss. If necessary, the thus set threshold is further modified by considering the precision of the pressure sensor.

If the determination at the step 110 produces a "NO" answer, then the process completes the present cycle without transmitting the pressure transmitting signal.

Otherwise, if the determination at the step 110 produces a "YES" answer, then the process proceeds to the step 120.

At the step 120, the controlling unit 23a makes a further determination as to whether the rapid change in the inflation pressure of the tire is caused by a rapid change in the air temperature within the tire. More specifically, the controlling unit 23a determines whether the change (denoted by Tc in FIG. 4) in the air temperature within the tire is greater than or equal to a second predetermined threshold (denoted by Tth in FIG. 4).

In the present embodiment, the change in the air temperature within the tire is represented by the difference between the air temperature determined in the present cycle and that determined in the immediately preceding cycle.

If the determination at the step 120 produces a "YES" answer, then the process completes the present cycle without transmitting the pressure transmitting signal.

This is because, in this case, the rapid change in the inflation pressure of the tire is caused by the rapid change in the air temperature within the tire, according to Boyle-Charles law, but is not caused by a rapid change in the amount of air within tire due to, e.g., a blowout.

Otherwise, if the determination at the step 120 produces a "NO" answer, then the process proceeds to the step 130.

At the step 130, the controlling unit 23a controls the transmitting/receiving unit 23b to transmit, via the antenna 24, the pressure transmitting signal that contains the information on the inflation pressure of the tire and the identification code unique to the tire monitor 2.

At the step 140, the controlling unit 23a makes a determination as to whether the transmitting/receiving unit 23b has received the acknowledge signal for a predetermined time period Pt1 after the last transmission of the pressure transmitting signal.

In the present embodiment, the predetermined time period Pt1 for the determination at the step 140 is set to a value (e.g., 50 ms) greater than the sum of a time (e.g., 15 ms) required for each of the tire monitors 2 to transmit the pressure transmitting signal and a time (e.g., 20 ms) required for the corresponding one of the transmitters 8a-8d to transmit the acknowledge signal.

If the determination at the step 140 produces a "YES" answer, then the process completes the present cycle. More specifically, in this case, the controlling unit 23a recognizes, upon receipt of the acknowledge signal, that the pressure transmitting signal has been received by the receiver 3.

Otherwise, if the determination at the step 140 produces a "NO" answer, then the process proceeds to the step 150.

At the step 150, the controlling unit 23a controls the transmitting/receiving unit 23b to retransmit the pressure transmitting signal.

In addition, in the present embodiment, the controlling unit 23a includes a counter to count the number Nt of retransmissions of the pressure transmitting signal. At the step 150, Nt is accordingly increased by 1.

At the succeeding step 160, the controlling unit 23a determines whether Nt is equal to a predetermined number Np.

If the determination at the step 160 produces a "NO" answer, then the process returns to the step 140.

More specifically, in this case, to increase the probability of the pressure transmitting signal being received by the receiver 3, the controlling unit 23a controls the transmitting/receiving unit 23b to repeatedly transmit the pressure transmitting signal until the transmitting/receiving unit 23b receives the acknowledge signal or Nt reaches Np.

Otherwise, if the determination at the step 160 produces a "YES" answer, then the process proceeds to the step 170, at which the operation of the tire monitor 2 is shifted from the power saving mode to the periodic transmission mode.

More specifically, in this case, the controlling unit 23a determines that it is impossible to establish a normal two-way communication between the tire monitor 2 and the receiver 3, and thus shifts the operation of the tire monitor 2 from the power saving mode to the periodic transmission mode.

In addition, the controlling unit 23a resets the number Nt of retransmissions of the pressure transmitting signal upon obtaining an affirmative result (i.e., the "YES" answer) from the determination at the step 140 or from the determination at the step 160.

Figure 5:
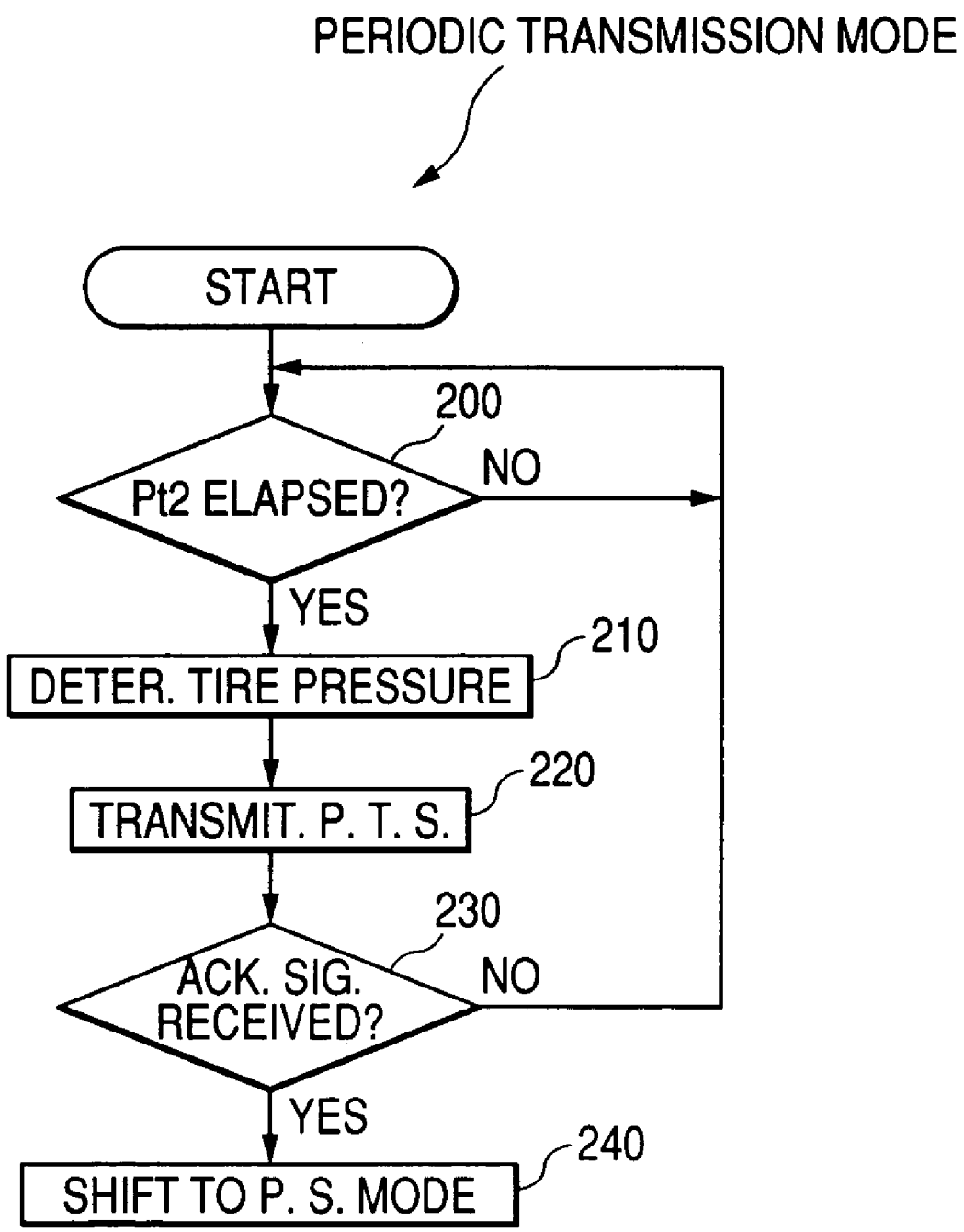
FIG. 5 is a flowchart showing a process of each of the tire monitors during the operation thereof in a periodic transmission mode according to the first embodiment of the invention.

FIG. 5 shows the process of each of the tire monitors 2 during the operation thereof in the periodic transmission mode. This process is periodically performed by the controlling unit 23a of each of the tire monitors 2.

First, at the step 200, the controlling unit 23a determines whether a predetermined time period Pt2 has elapsed from the last transmission of the pressure transmitting signal.

The predetermined time period Pt2 makes up the time interval between two successive transmissions of the pressure transmitting signal in the periodic transmission mode. In the present embodiment, as described previously, the predetermined time period Pt2 is set to a larger value (e.g., 1 minute) when the change in the inflation pressure of the tire is slow and to a smaller value (e.g., 15 s) when the change is rapid.

In addition, though not shown in FIG. 5, the predetermined time period Pt2 is set by the controlling unit 23a based on the change in the inflation pressure of the tire.

After the predetermined time period Pt2 has elapsed from the last transmission of the pressure transmitting signal, the process proceeds to the step 210, at which the controlling unit 23a determines the inflation pressure of the tire.

At the succeeding step 220, the controlling unit 23a controls the transmitting/receiving unit 23b to transmit, via the antenna 24, the pressure transmitting signal that contains the information on the inflation pressure of the tire and the identification code unique to the tire monitor 2.

At the step 230, the controlling unit 23a makes a determination as to whether the transmitting/receiving unit 23b has received the acknowledge signal.

If the determination at the step 230 produces a "NO" answer, then the process returns to the step 200.

Otherwise, if the determination at the step 230 produces a "YES" answer, then the process proceeds to the step 240, at which the operation of the tire monitor 2 is shifted from the periodic transmission mode to the power saving mode.

More specifically, in this case, the controlling unit 23a determines that it is possible to establish a normal two-way communication between the tire monitor 2 and the receiver 3, and thus shifts the operation of the tire monitor 2 from the periodic transmission mode to the power saving mode.

Figure 6:
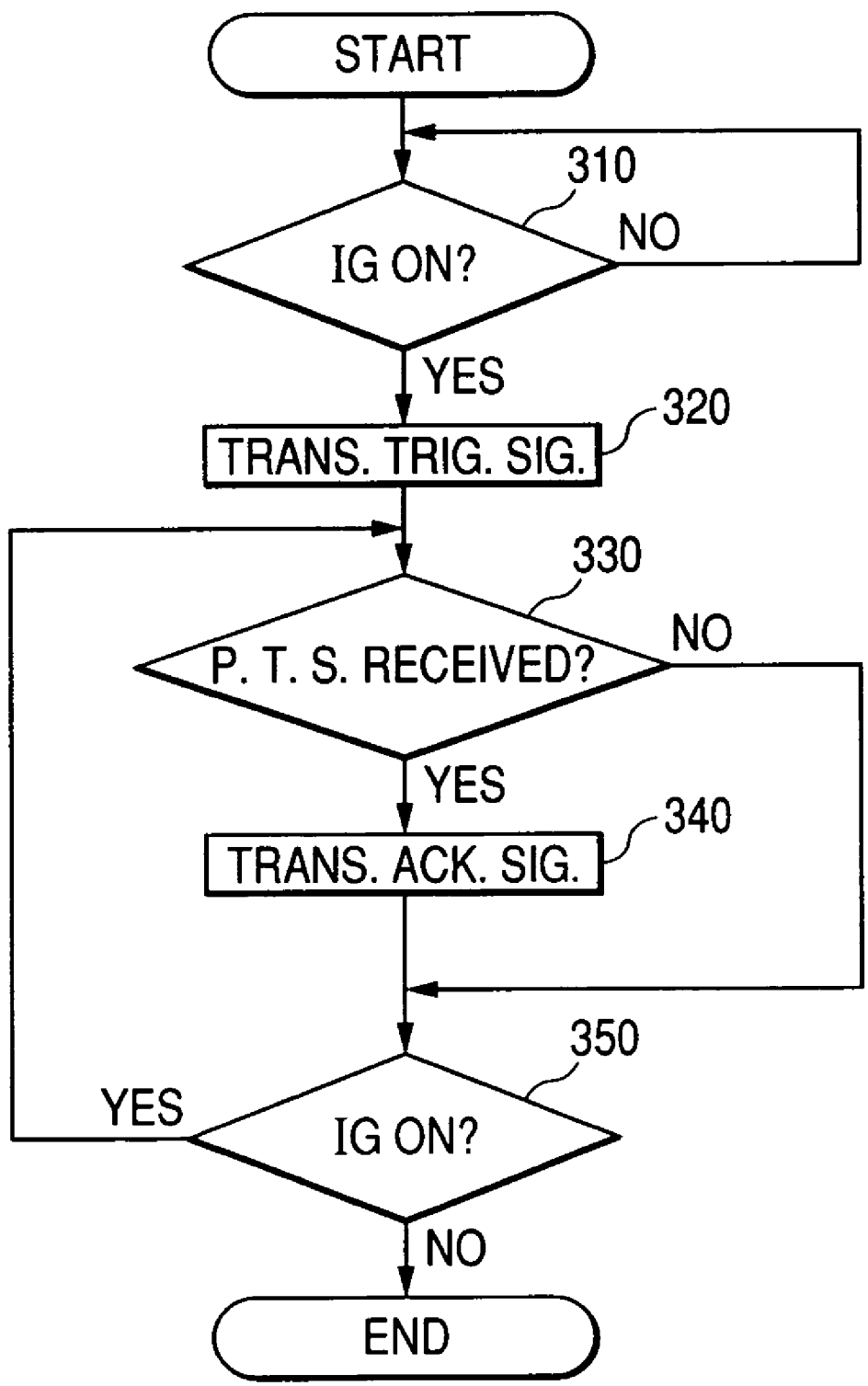
FIG. 6 is a flowchart showing a process of the receiver for performing two-way communication with the tire monitors according to the first embodiment of the invention.

FIG. 6 shows the process of the receiver 3 for performing two-way communication with the tire monitors 2. This process is performed by the controlling unit 32b of the receiver 3.

First, at the step 310, the controlling unit 32b determines whether the ignition switch (denoted by IG in FIG. 6) of the vehicle 1 is turned on.

If the determination at the step 310 produces a "NO" answer, in other words, if the vehicle 1 has not yet started running, then the controlling unit 32b waits for the ignition switch of the vehicle 1 to be turned on.

Otherwise, if the determination at the step 310 produces a "YES" answer, in other words, if the vehicle 1 has started running, then the process proceeds to the step 320.

At the step 320, the controlling unit 32b controls each of the transmitters 8a-8d to transmit the trigger signal.

As described previously, the trigger signal transmitted by each of the transmitters 8a-8d represents a request for a corresponding one of the tire monitors 2 to transmit the pressure transmitting signal. In response to receipt of the trigger signal, the operation of each of the tire monitors 2 is shifted from any of the long-period periodic transmission mode, the periodic transmission mode, and the power saving mode to the triggered transmission mode. In the triggered transmission mode, each of the tire monitors 2 transmits once the pressure transmitting signal, and then the operation thereof is shifted back from the triggered transmission mode to the former mode. Thus, the controlling unit 32b can determine, upon receipt of the pressure transmitting signals from the tire monitors 2, the initial values of inflation pressure of the tires based on the information contained in the received pressure transmitting signals.

At the step 330, the controlling unit 32b determines whether the pressure transmitting signal transmitted by each of the tire monitors 2 is received by the receiving unit 32a.

If the determination at the step 330 produces a "NO" answer, then the process directly goes on to the step 350.

Otherwise, if the determination at the step 330 produces a "YES" answer, then the process proceeds to the step 340.

At the step 340, the controlling unit 32b controls the corresponding one of the transmitters 8a-8d to transmit the acknowledge signal to inform the each of the tire monitors 2 that the pressure transmitting signal has been received by the receiver 3.

At the step 350, the controlling unit 32b makes a determination as to whether the ignition switch of the vehicle 1 is still on.

If the determination at the step 350 produces a "YES" answer, in other words, if the vehicle 1 is still running, then the process returns to the step 330.

Otherwise, if the determination at the step 350 produces a "NO" answer, in other words, if the vehicle 1 is stopped, then the process goes to the end.

Figure 7B:
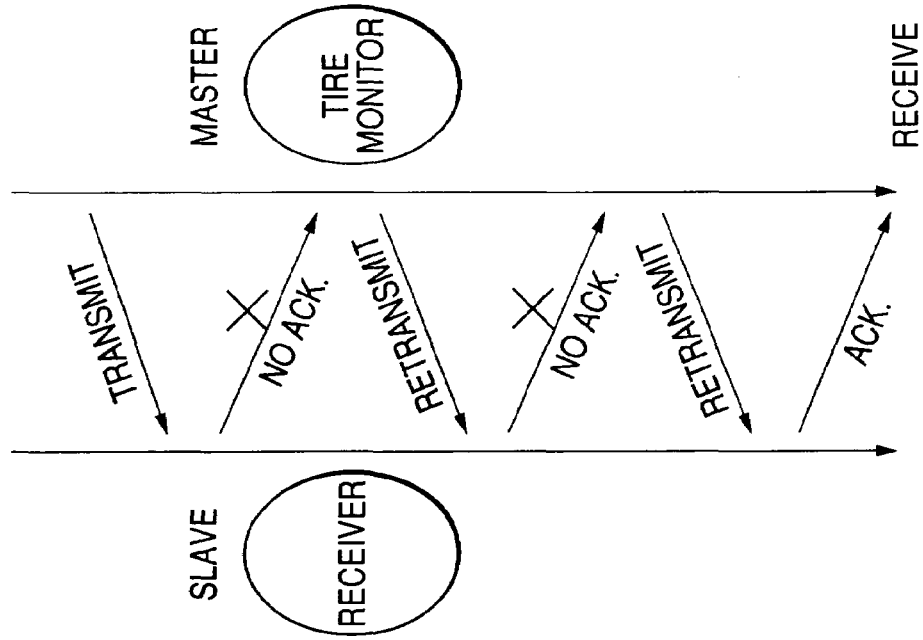
FIG. 7B is a schematic view illustrating the operation of the remote tire pressure monitoring system of FIG. 1.
Figure 7A:
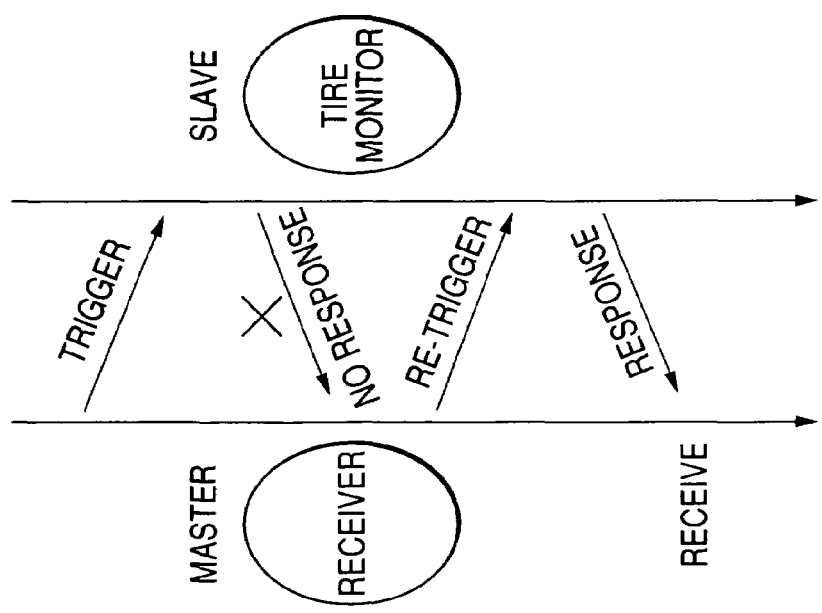
FIG. 7A is a schematic view illustrating the operation of a first prior art remote tire pressure monitoring system.

FIGS. 7A and 7B together give a comparison between the operations of a first conventional remote tire pressure monitoring system, in which tire monitors operate in the triggered transmission mode, and the remote tire pressure monitoring S1 according to the present embodiment. It should be noted that, for the sake of brevity, only the communication between a single tire monitor and the receiver is illustrated in those figures.

In the first conventional system, as shown in FIG. 7A, the receiver mounted on the body of a vehicle functions as a master device, whereas the tire monitor mounted a wheel of the vehicle functions as a slave device. Specifically, when the receiver requires information on the inflation pressure of the tire fitted on the wheel, it controls a transmitter (not shown) mounted on the body of the vehicle to transmit a trigger signal. In response to receipt of the trigger signal, the tire monitor transmits a pressure transmitting signal containing the information on the inflation pressure of the tire. Further, the receiver determines if the pressure transmitting signal from the tire monitor has been received thereby for a predetermined time period after the transmission of the trigger signal, and if not, controls the transmitter to retransmit the trigger signal.

In the present system S1, as shown in FIG. 7B, the tire monitor 2 functions as a master device, whereas the receiver 3 functions as a slave device. Specifically, during operation in the power saving mode, the tire monitor 2 determines if it is time to transmit the pressure transmitting signal, and if it is, transmits the pressure transmitting signal. In response to receipt of the pressure transmitting signal, the receiver 3 controls the corresponding one of the transmitters 8a-8d to transmit the acknowledge signal. Further, the tire monitor 2 determines if the acknowledge signal has been received thereby for the predetermined time period Pt1 after the last transmission of the pressure transmitting signal, and if not, retransmit the pressure transmitting signal.

From the above comparison, it becomes apparent that in the remote tire pressure monitoring system S1 according to the present embodiment, the tire monitors 2 can provide the information on the inflation pressure of the tires to the receiver 3 in a more timely manner than in the first conventional remote tire pressure monitoring system.

Figure 8A:
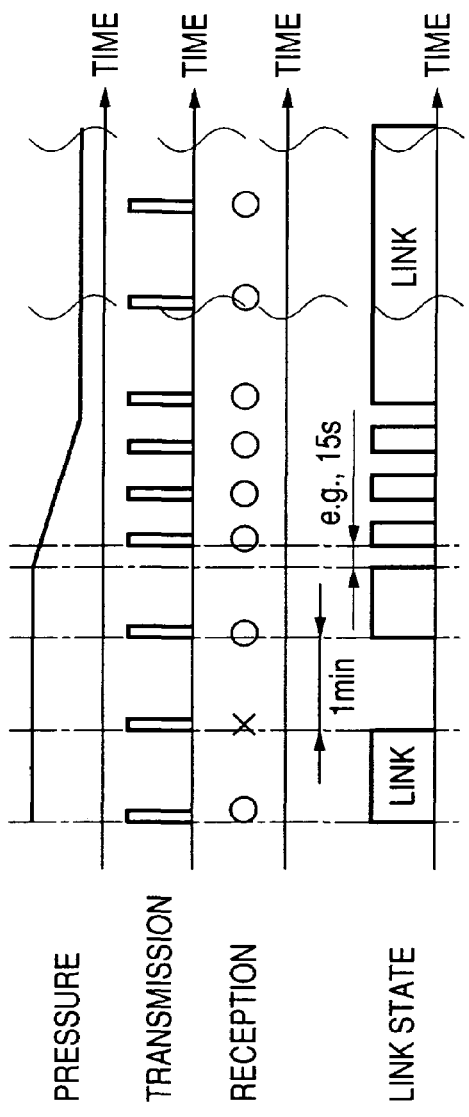
FIG. 8A is a time chart illustrating the operation of a second prior art remote tire pressure monitoring system.
Figure 8B:
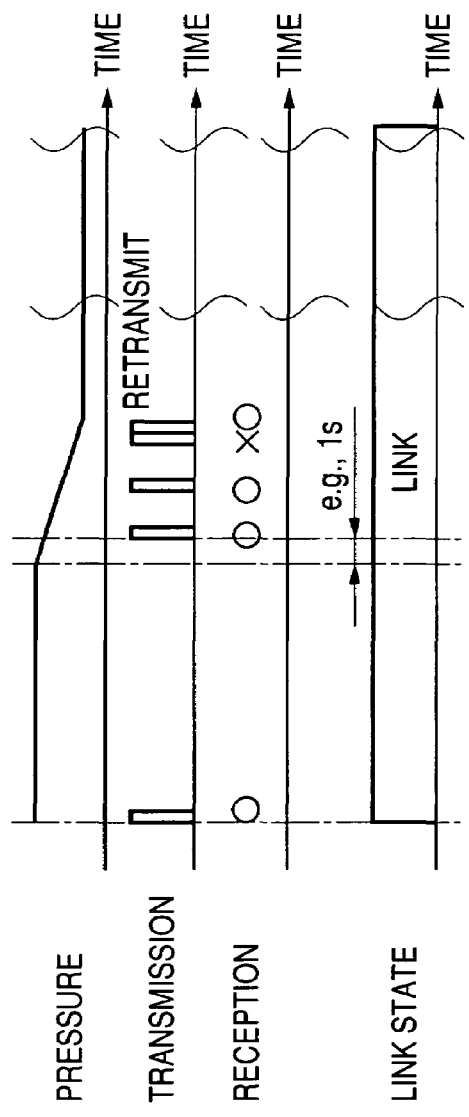
FIG. 8B is a time chart illustrating the operation of the remote tire pressure monitoring system of FIG. 1.

FIGS. 8A-8B together give a comparison between the operations of a second conventional remote tire pressure monitoring system, in which tire monitors operate in the periodic transmission mode, and the remote tire pressure monitoring S1 according to the present embodiment. It should be noted that, for the sake of brevity, only the communication between a single tire monitor and the receiver is illustrated in those figures.

In the second conventional system, as shown in FIG. 8A, the tire monitor periodically transmits the pressure transmitting signal at relatively long time intervals (e.g., 1 minute) before arrival of a rapid change in the inflation pressure of the tire. At this stage, if the receiver fails once in receiving the pressure transmitting signal, the link between the tire monitor and the receiver will be broken for a time period having the length of the relatively long time interval.

Further, when the inflation pressure of the tire comes to change rapidly, the tire monitor periodically transmits the pressure transmitting signal at relatively short time intervals (e.g., 15 s). However, even with the relatively short time intervals, update of the information on the inflation pressure of the tire in the receiver cannot catch up the rapid change in the inflation pressure of the tire for the majority of duration of the rapid change.

Consequently, in the second conventional system, it is impossible to establish a "pressure hot link" between the tire monitors and the receiver. The pressure hot link here denotes, as described previously, such a link between the tire monitors and the receiver that the information on the inflation pressure of the tires stored in the receiver can be automatically updated as the information on the inflation pressure of the tires obtained by the tire monitors is updated.

Accordingly, with the second conventional system, it is impossible to achieve a real-time monitoring of the inflation pressure of the tires.

In the present system S1, as shown in FIG. 8B, the tire monitor 2 does not transmit, during operation thereof in the power saving mode, the pressure transmitting signal before arrival of a rapid change in the inflation pressure of the tire. At this stage, since the inflation pressure of the tire does not change rapidly, there is no need to update the information on the inflation pressure of the tire stored in the receiver 3. Thus, it is possible to establish the pressure hot link between the tire monitor 2 and the receiver 3 without transmission of the pressure transmitting signal. Moreover, a lot of power will be saved due to no transmission of the pressure transmitting signal.

Further, with the saved power, the tire monitor 2 can cyclically transmit the pressure transmitting signal at very short time intervals (e.g., 1 s) when the inflation pressure of the tire comes to change rapidly. Thus, with the very short time intervals, update of the information on the inflation pressure of the tire in the receiver 3 can catch up the rapid change in the inflation pressure of the tire for the majority of duration of the rapid change. Consequently, the pressure hot link between the tire monitor 2 and the receiver 3 can be kept.

Accordingly, the present system S1 can achieve an almost real-time monitoring of the inflation pressure of the tires while significantly decreasing the power consumption of the tire monitors 2.

In addition, in the present embodiment, the power saving mode can also be referred to as a "pressure hot link mode", in the sense of achieving a real-time monitoring of the inflation pressure of the tires.

FIG. 9 shows the results of an experimental investigation on the power consumption of each of the tire monitors of the second conventional system and that of each of the tire monitors 2 of the present system S1.

In the investigation, each of the tire monitors of the second conventional system was configured to periodically determine the inflation pressure of the tire at intervals of 15 s and periodically transmit the pressure transmitting signal at intervals of 1 minute. With such a configuration, the total power consumption of each of the tire monitors for a given time period was 419 mA/h. Moreover, of the total power consumption, 81% was for transmission of the pressure transmitting signal while only 3% was for determination of the inflation pressure of the tire.

In comparison, each of the tire monitors 2 of the present system S1 was configured to operate in the power saving mode, in which the inflation pressure of the tire was cyclically determined at intervals of 1 s and the pressure transmitting signal was transmitted only when the change in the inflation pressure of the tire was greater than or equal to ±5 kPa. With such a configuration, the total power consumption of each of the tire monitors 2 for the same given time period was 176 mA/h, which equals 42% of the total power consumption of each of the tire monitors in the second conventional system. Moreover, of the total power consumption, only 12% was for transmission of the pressure transmitting signal while 61% was for determination of the inflation pressure of the tire.

Second Embodiment

This embodiment illustrates an operation of the remote tire pressure monitoring system S1 which is different from the operation of the same according to the first embodiment.

In the previous embodiment, the acknowledge signal may be of any type which is recognizable by the tire monitors 2. Moreover, upon receipt of the acknowledge signal, each of the tire monitors 2 recognizes, without any verification, that the pressure transmitting signal transmitted thereby has certainly been received by the receiver 3.

However, in case that the same acknowledge signal is used for all remote tire pressure monitoring systems, it may be difficult to ensure the reliability of those systems. Specifically, in such case, each of the tire monitors 2 of the remote tire pressure monitoring system S1 cannot distinguish the acknowledge signal transmitted from the corresponding one of the transmitters 8a-8d from that transmitted from a foreign transmitter on another vehicle running in close vicinity to the vehicle 1; thus, it may misrecognize, upon receipt of the acknowledge signal transmitted from the foreign transmitter, that the pressure transmitting signal transmitted thereby has certainly been received by the receiver 3.

To solve the above problem, one may consider adopting an approach which uses a vehicle identification code. Specifically, according to the approach, the acknowledge signal may contain a vehicle identification code unique to the vehicle 1; thus, based on the vehicle identification code contained in the received acknowledge signal, the tire monitors 2 can identify the acknowledge signal as being transmitted from the corresponding transmitters 8a-8d not from foreign transmitters on other vehicles.

However, to adopt the above approach, it is necessary to allocate a unique vehicle identification code to every vehicle and to store in every tire monitor the vehicle identification code unique to the vehicle on which the tire monitor is mounted. This will significantly increase the number of manufacturing processes and thus the manufacturing cost of remote tire pressure monitoring systems.

The operation of the remote tire pressure monitoring system S1 according to the present embodiment has been devised to solve the above problem without using a vehicle identification code.

Specifically, in the present embodiment, each of the tire monitors 2 transmits the pressure transmitting signal that contains, as described previously, the identification code unique to the tire monitor 2; in response to receipt of the pressure transmitting signal, the receiver 3 controls the corresponding one of the transmitters 8a-8d to transmit the acknowledge signal that contains the identification code contained in the received pressure transmitting signal; upon receipt of the acknowledge signal, each of the tire monitors 2 determines if the identification code contained in the received acknowledge signal is the one unique thereto, and if it is, recognizes that the pressure transmitting signal transmitted thereby has certainly been received by the receiver 3.

Figure 10:
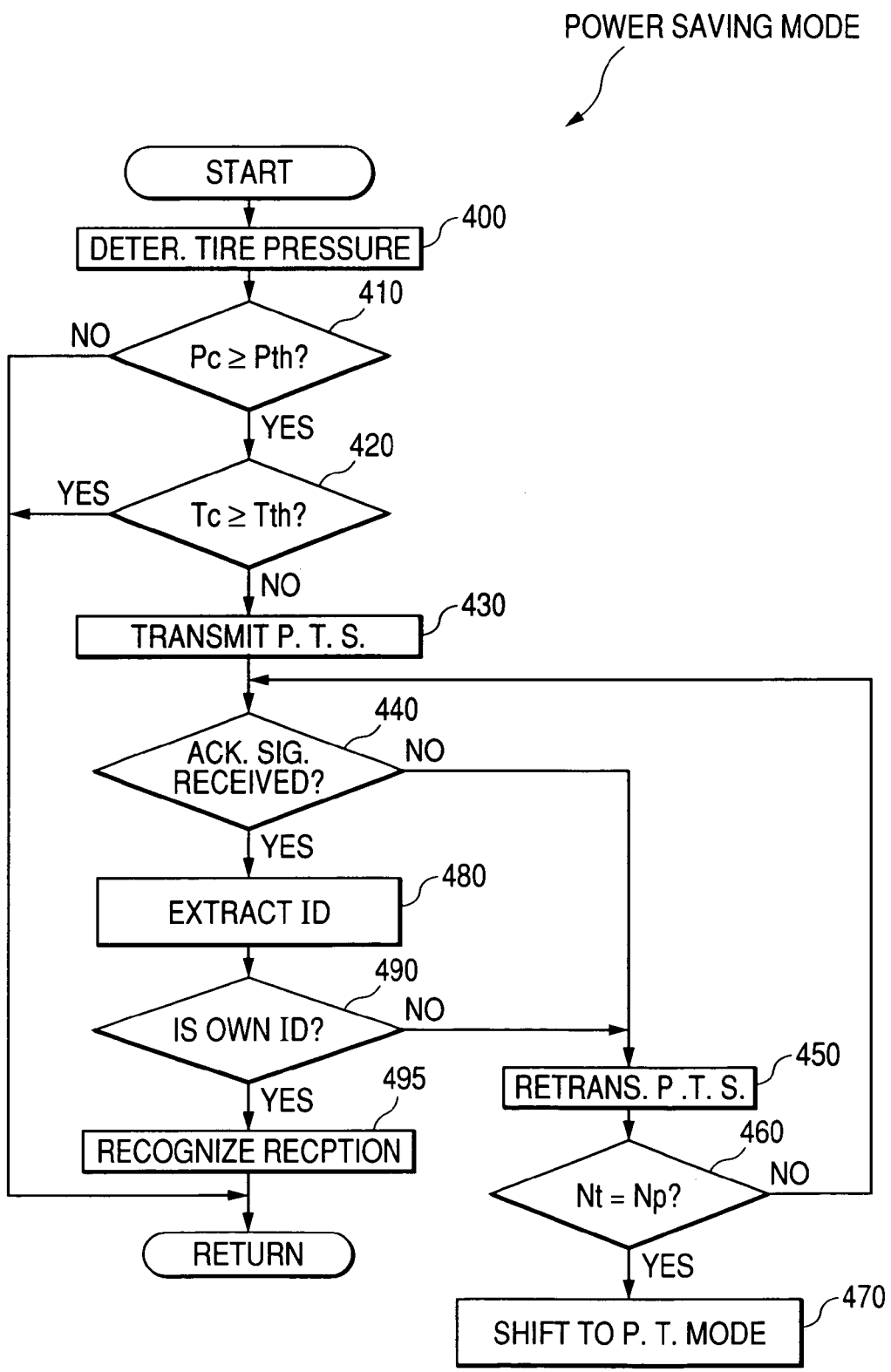
FIG. 10 is a flowchart showing a process of each of the tire monitors during the operation thereof in the power saving mode according to the second embodiment of the invention.

FIG. 10 shows the process of each of the tire monitors 2 during the operation thereof in the power saving mode according to the present embodiment. This process is repeatedly performed by the controlling unit 23a of each of the tire monitors 2.

First, at the step 400, the controlling unit 23a determines the inflation pressure of the tire based on the sensing signals outputted from the sensing unit 21.

At the step 410, the controlling unit 23a makes a determination as to whether there is a rapid change in the inflation pressure of the tire. More specifically, the controlling unit 23a determines whether the change (denoted by Pc in FIG. 10) in the inflation pressure of the tire is greater than or equal to the predetermined threshold (denoted by Pth).

In the present embodiment, the change in the inflation pressure of the tire is computed in the same way as in the previous embodiment. Moreover, the threshold is also predetermined in the same way as in the previous embodiment. Therefore, the detailed description thereof is omitted here.

If the determination at the step 410 produces a "NO" answer, then the process completes the present cycle without transmitting the pressure transmitting signal.

Otherwise, if the determination at the step 410 produces a "YES" answer, then the process proceeds to the step 420.

At the step 420, the controlling unit 23a makes a further determination as to whether the rapid change in the inflation pressure of the tire is caused by a rapid change in the air temperature within the tire. More specifically, the controlling unit 23a determines whether the change (denoted by Tc in FIG. 10) in the air temperature within the tire is greater than or equal to a second predetermined threshold (denoted by Tth in FIG. 10).

In the present embodiment, the change in the air temperature within the tire is computed in the same way as in the previous embodiment; therefore, the description thereof is omitted here.

If the determination at the step 420 produces a "YES" answer, then the process completes the present cycle without transmitting the pressure transmitting signal.

This is because, in this case, the rapid change in the inflation pressure of the tire is caused by the rapid change in the air temperature within the tire, according to Boyle-Charles law, but is not caused by a rapid change in the amount of air within tire due to, e.g., a blowout.

Otherwise, if the determination at the step 420 produces a "NO" answer, then the process proceeds to the step 430.

At the step 430, the controlling unit 23a controls the transmitting/receiving unit 23b to transmit, via the antenna 24, the pressure transmitting signal that contains the information on the inflation pressure of the tire and the identification code unique to the tire monitor 2.

At the step 440, the controlling unit 23a makes a determination as to whether the transmitting/receiving unit 23b has received the acknowledge signal for the predetermined time period Pt1 after the last transmission of the pressure transmitting signal.

In the present embodiment, the predetermined time period Pt1 for the determination at the step 440 is set in the same way as in the previous embodiment; therefore, the detailed description thereof is omitted here.

If the determination at the step 440 produces a "NO" answer, then the process proceeds to the step 450.

At the step 450, the controlling unit 23a controls the transmitting/receiving unit 23b to retransmit the pressure transmitting signal.

In addition, in the present embodiment, the controlling unit 23a includes a counter to count the number Nt of retransmissions of the pressure transmitting signal. At the step 450, Nt is accordingly increased by 1.

At the succeeding step 460, the controlling unit 23a determines whether Nt is equal to the predetermined number Np.

If the determination at the step 460 produces a "NO" answer, then the process returns to the step 440.

More specifically, in this case, to increase the probability of the pressure transmitting signal being received by the receiver 3, the controlling unit 23a controls the transmitting/receiving unit 23b to repeatedly transmit the pressure transmitting signal until the transmitting/receiving unit 23b receives the acknowledge signal or Nt reaches Np.

Otherwise, if the determination at the step 460 produces a "YES" answer, then the process proceeds to the step 470, at which the operation of the tire monitor 2 is shifted from the power saving mode to the periodic transmission mode.

More specifically, in this case, the controlling unit 23a determines that it is impossible to establish a normal two-way communication between the tire monitor 2 and the receiver 3, and thus shifts the operation of the tire monitor 2 from the power saving mode to the periodic transmission mode.

On the other hand, if the determination at the step 440 produces a "YES" answer, then the process proceeds to the step 480.

At the step 480, the controlling unit 23a extracts the identification code contained in the received acknowledge signal.

At the succeeding step 490, the controlling unit 23a makes a determination as to whether the identification code extracted from the received acknowledge signal is the identification code unique to the tire monitor 2.

If the determination at the step 490 produces a "NO" answer, then the process goes on to the step 450.

Otherwise, if the determination at the step 490 produces a "YES" answer, then the process proceeds to the step 495.

At the step 495, the controlling unit 23a recognizes that the pressure transmitting signal transmitted by the tire monitor 2 has certainly been received by the receiver 3. Then, the process completes the present cycle.

In addition, the controlling unit 23a resets the number Nt of retransmissions of the pressure transmitting signal upon obtaining an affirmative result (i.e., the "YES" answer) from the determination at the step 460 or from the determination at the step 490.

Figure 11:
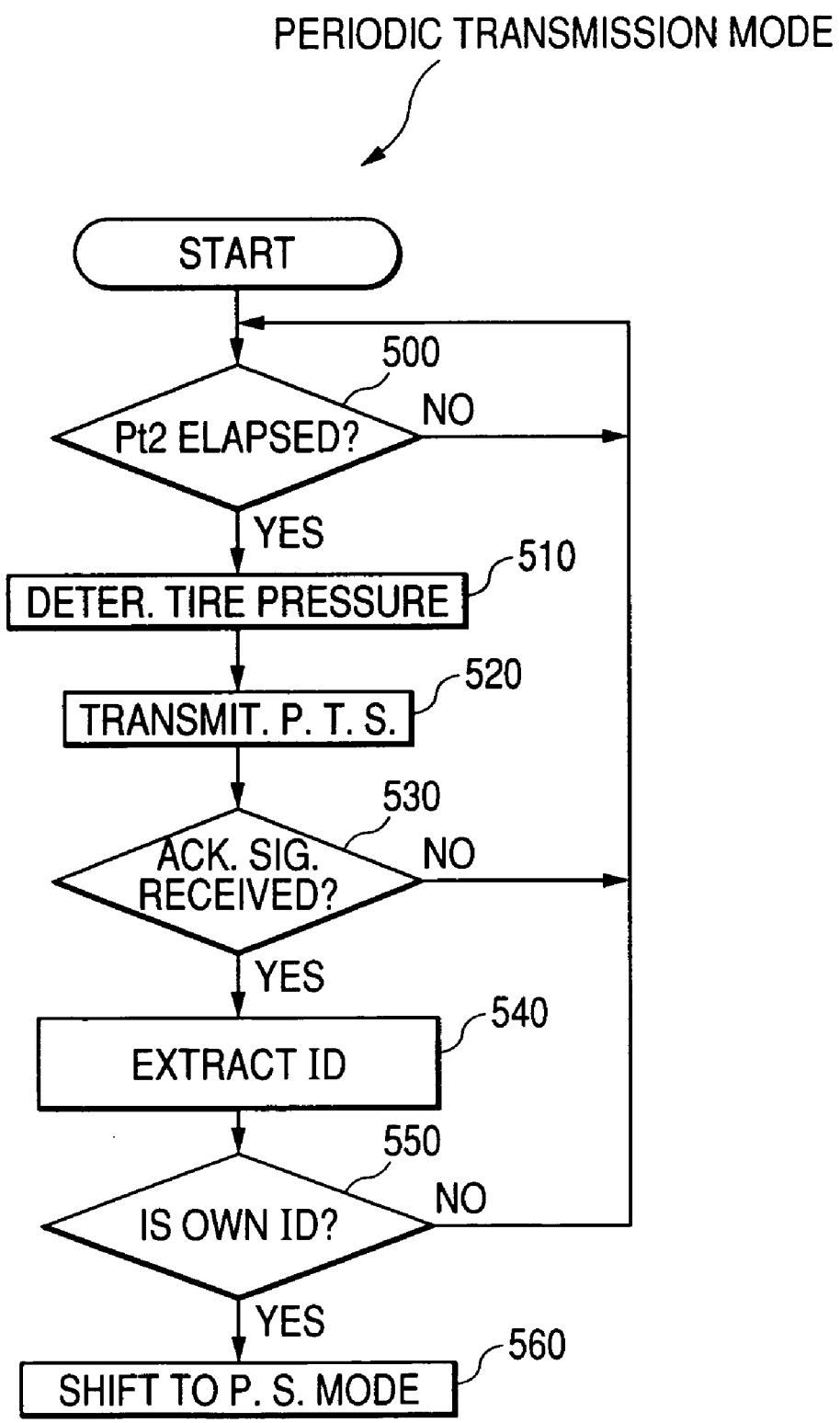
FIG. 11 is a flowchart showing a process of each of the tire monitors during the operation thereof in the periodic transmission mode according to the second embodiment of the invention.

FIG. 11 shows the process of each of the tire monitors 2 during the operation thereof in the periodic transmission mode according to the present embodiment. This process is periodically performed by the controlling unit 23a of each of the tire monitors 2.

First, at the step 500, the controlling unit 23a determines whether the predetermined time period Pt2 has elapsed from the last transmission of the pressure transmitting signal.

The predetermined time period Pt2 makes up the time interval between two successive transmissions of the pressure transmitting signal in the periodic transmission mode. In the present embodiment, the predetermined time period Pt2 is set in the same way as in the previous embodiment; thereof, the detailed description thereof is omitted here.

After the predetermined time period Pt2 has elapsed from the last transmission of the pressure transmitting signal, the process proceeds to the step 510, at which the controlling unit 23a determines the inflation pressure of the tire.

At the succeeding step 520, the controlling unit 23a controls the transmitting/receiving unit 23b to transmit, via the antenna 24, the pressure transmitting signal that contains the information on the inflation pressure of the tire and the identification code unique to the tire monitor 2.

At the step 530, the controlling unit 23a makes a determination as to whether the transmitting/receiving unit 23b has received the acknowledge signal.

If the determination at the step 530 produces a "NO" answer, then the process returns to the step 500.

Otherwise, if the determination at the step 530 produces a "YES" answer, then the process proceeds to the step 540.

At the step 540, the controlling unit 23a extracts the identification code contained in the received acknowledge signal.

At the succeeding step 550, the controlling unit 23a makes a determination as to whether the identification code extracted from the received acknowledge signal is the identification code unique to the tire monitor 2.

If the determination at the step 550 produces a "NO" answer, then the process returns to the step 500.

Otherwise, if the determination at the step 550 produces a "YES" answer, then the process proceeds to the step 560.

At the step 560, the controlling unit 23a recognizes that the pressure transmitting signal transmitted from the tire monitor 2 has certainly been received by the receiver 3, and then shifts the operation of the tire monitor 2 from the periodic transmission mode to the power saving mode.

Figure 12:
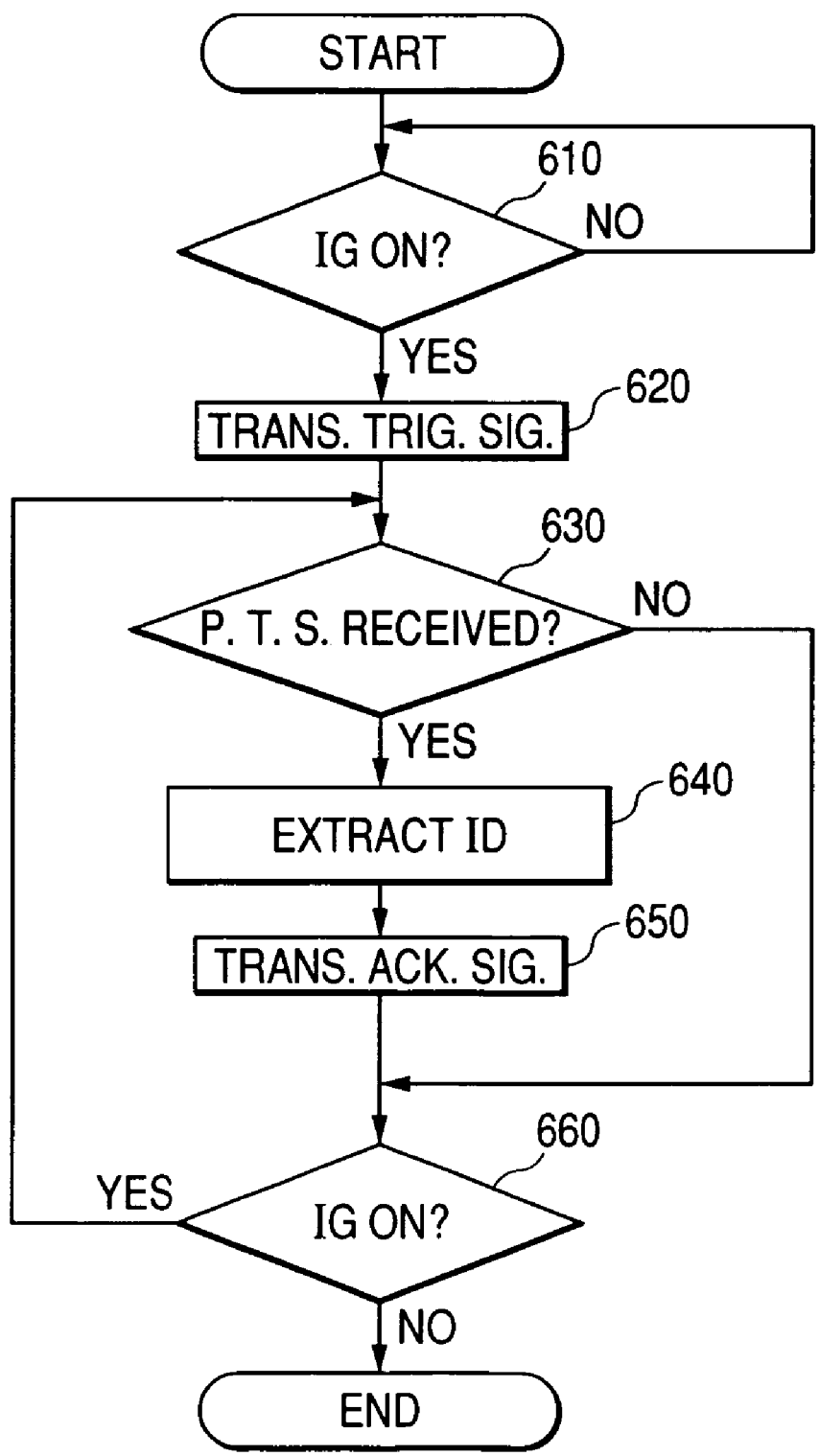
FIG. 12 is a flowchart showing a process of the receiver for performing two-way communication with the tire monitors according to the second embodiment of the invention.

FIG. 12 shows the process of the receiver 3 for reliably performing two-way communication with the tire monitors 2 according to the present embodiment. This process is performed by the controlling unit 32b of the receiver 3.

First, at the step 610, the controlling unit 32b determines whether the ignition switch (denoted by IG in FIG. 12) of the vehicle 1 is turned on.

If the determination at the step 610 produces a "NO" answer, in other words, if the vehicle 1 has not yet started running, then the controlling unit 32b waits for the ignition switch of the vehicle 1 to be turned on.

Otherwise, if the determination at the step 610 produces a "YES" answer, in other words, if the vehicle 1 has started running, then the process proceeds to the step 620.

At the step 620, the controlling unit 32b controls each of the transmitters 8a-8d to transmit the trigger signal.

As described previously, the trigger signal transmitted by each of the transmitters 8a-8d represents a request for a corresponding one of the tire monitors 2 to transmit the pressure transmitting signal. In response to receipt of the trigger signal, the operation of each of the tire monitors 2 is shifted from any of the long-period periodic transmission mode, the periodic transmission mode, and the power saving mode to the triggered transmission mode. In the triggered transmission mode, each of the tire monitors 2 transmits once the pressure transmitting signal, and then the operation thereof is shifted back from the triggered transmission mode to the former mode. Thus, the controlling unit 32b can determine, upon receipt of the pressure transmitting signals from the tire monitors 2, the initial values of inflation pressure of the tires based on the information contained in the received pressure transmitting signals.

At the step 630, the controlling unit 32b determines whether the pressure transmitting signal transmitted by each of the tire monitors 2 is received by the receiving unit 32a.

If the determination at the step 630 produces a "NO" answer, then the process directly goes on to the step 660.

Otherwise, if the determination at the step 630 produces a "YES" answer, then the process proceeds to the step 640.

At the step 640, the controlling unit 32b extracts the identification code contained in the received pressure transmitting signal.

At the succeeding step 650, the controlling unit 32b assembles into the acknowledge signal the identification code extracted from the received pressure transmitting signal, and then controls the corresponding one of the transmitters 8a-8d to transmit the acknowledge signal.

At the step 660, the controlling unit 32b makes a determination as to whether the ignition switch of the vehicle 1 is still on.

If the determination at the step 660 produces a "YES" answer, in other words, if the vehicle 1 is still running, then the process returns to the step 630.

Otherwise, if the determination at the step 660 produces a "NO" answer, in other words, if the vehicle 1 is stopped, then the process goes to the end.

FIG. 13 illustrates the relation between transmission of the pressure transmitting signal by each of the tire monitors 2 and transmission of the acknowledge signal in response to receipt of the pressure transmitting signal by the receiver 3.

As shown in FIG. 13, each of the tire monitors 2 transmits the pressure transmitting signal that contains the identification code (ID code) unique to the tire monitor 2. In response to receipt of the pressure transmitting signal, the receiver 3 controls the corresponding one of the transmitters 8a-8d to transmit the acknowledge signal that contains the same identification code as the received pressure transmitting signal. Consequently, upon receipt of the acknowledge signal, each of the tire monitors 2 can accurately determine, through comparison between the identification code contained in the received acknowledge signal and the identification code unique thereto, whether the pressure transmitting signal transmitted thereby has been received by the receiver 3.

Accordingly, with the operation of the remote tire pressure monitoring system S1 according to the present embodiment, it is possible to achieve a more reliable and almost real-time monitoring of the inflation pressure of tires of the vehicle 1, without increasing the manufacturing cost of the system S1.

While the above particular embodiments of the invention have been shown and described, it will be understood by those who practice the invention and those skilled in the art that various modifications, changes, and improvements may be made to the invention without departing from the spirit of the disclosed concept.

For example, as described in the first embodiment, each of the tire monitors 2 may be configured to further include a running detection device (e.g., an acceleration sensor) that works to determine whether the vehicle 1 is running or at a standstill. In this case, each of the tire monitors 2 may be configured to operate in the long-period periodic transmission mode when the running detection device detects the vehicle 1 being at a standstill, and keep the operation thereof in the long-period periodic transmission mode until the running detection device detects the vehicle 1 running.

With such a configuration, in case that the remote tire pressure monitoring system S1 further includes a fifth tire monitor 2 mounted to a spare tire of the vehicle 1, it is possible to inhibit the operation of the fifth tire monitor 2 from being accidentally shifted from the long-period periodic mode to any other mode due to reception of an unexpected signal.

In the previous embodiments, the change in the inflation pressure of each of the tires is represented by the difference between the inflation pressure determined in a present cycle and that determined in an immediately preceding cycle.

However, the change in the inflation pressure of each of the tires may also be represented by the change rate in the inflation pressure for each cycle. In this case, the threshold may be accordingly predetermined in consideration of different change rates for different patterns of change as well as the precision of the pressure sensor.

In the second embodiment, each of the tire monitors 2 transmits the pressure transmitting signal that contains the identification code unique to the tire monitor 2 as a specific code; in response to receipt of the pressure transmitting signal, the receiver 3 controls the corresponding one of the transmitters 8a-8d to transmit the acknowledge signal that contains the identification code contained in the received pressure transmitting signal as an acknowledge code; upon receipt of the acknowledge signal, each of the tire monitors 2 determines if the acknowledge code contained in the received acknowledge signal is identical to the specific code (i.e., the identification code) contained in the pressure transmitting signal transmitted thereby, and if it is, recognizes that the pressure transmitting signal transmitted thereby has certainly been received by the receiver 3.

As an alternative to the above, the receiver 3 may generate the acknowledge code as being identical to part of the specific code (i.e., the identification code) contained in the received pressure transmitting signal; each of the tire monitors 2 may determine if the acknowledge code contained in the received acknowledge signal is identical to part of the specific code contained in the pressure transmitting signal transmitted thereby, and if it is, recognize that the pressure transmitting signal transmitted thereby has certainly been received by the receiver 3.

Still as an alternative to the above, the receiver 3 may generate, based on the specific code contained in the received pressure transmitting signal, the acknowledge signal by using an operational expression that is stored in both the controlling unit 32b of the receiver 3 and the controlling unit 23a of each of the tire monitors 2 and defines a definite relationship between the whole or part of the specific code and the acknowledge signal; each of the tire monitors 2 may determine, by using the operational expression, if the acknowledge code contained in the received acknowledge signal and the whole or part of the specific code contained in the pressure transmitting signal transmitted thereby together satisfy the definite relationship, and if they do, recognize that the pressure transmitting signal transmitted thereby has certainly been received by the receiver 3.

For example, the receiver 3 may generate the acknowledge signal as an error-correcting code of the specific code contained in the received pressure transmitting signal.

Further, the specific code contained in the pressure transmitting signal may be a random bit string, instead of the identification code unique to the tire monitor 2. In other words, the pressure transmitting signal may contain, in addition to the information on the inflation pressure of the tire and the identification code unique to the tire monitor 2, a random bit string as the specific code.

Furthermore, the specific code contained in the pressure transmitting signal may be the whole or any part of data contained in the pressure transmitting signal.

In the previous embodiments, the remote tire pressure monitoring system S1 is configured to include four transmitters 8a-8d, each of which corresponds to one of the tire monitors 2.

However, the remote tire pressure monitoring system S1 may also be configured to include a single transmitter in the extent that all the tire monitors 2 can reliably receive signals transmitted by the single transmitter.

Such modifications, changes, and improvements are possible within the scope of the appended claims.

What is claimed is:

1. A remote tire pressure monitoring system comprising:
   a tire monitor provided on a wheel of a vehicle, the tire monitor being configured to operate in a power saving mode, in which the tire monitor senses inflation pressure of a tire fitted on the wheel, determines a change in the inflation pressure of the tire, and transmits a pressure transmitting signal containing information on the sensed inflation pressure of the tire only when the determined change in the inflation pressure of the tire is greater than or equal to a predetermined threshold;
   a receiver working to receive the pressure transmitting signal transmitted by the tire monitor;
   a transmitter working to transmit an acknowledge signal;
   a controller operatively connected with the receiver and the transmitter, the controller working to determine, upon receipt of the pressure transmitting signal by the receiver, the inflation pressure of the tire based on the information contained in the pressure transmitting signal, the controller also working to control, in response to receipt of the pressure transmitting signal by the receiver, the transmitter to transmit the acknowledge signal to inform the tire monitor that the receiver has received the pressure transmitting signal.

2. The remote tire pressure monitoring system as set forth in claim 1, wherein in the power saving mode, the tire monitor further senses air temperature within the tire, determines a change in the air temperature within the tire, and transmits the pressure transmitting signal only when the determined change in the inflation pressure of the tire is greater than or equal to the predetermined threshold and the determined change in the air temperature within the tire is less than a second predetermined threshold.

3. The remote tire pressure monitoring system as set forth in claim 1, wherein in the power saving mode, if the tire monitor has not received the acknowledge signal from the transmitter for a predetermined time period after the transmission of the pressure transmitting signal, the tire monitor retransmits the pressure transmitting signal.

4. The remote tire pressure monitoring system as set forth in claim 3, wherein in the power saving mode, if the tire monitor has not received the acknowledge signal from the transmitter after a predetermined number of retransmissions of the pressure transmitting signal, the tire monitor shifts the operation thereof from the power saving mode to a periodic transmission mode, in which the tire monitor periodically transmits the pressure transmitting signal at predetermined time intervals.

5. The remote tire pressure monitoring system as set forth in claim 4, wherein in the periodic transmission mode, the tire monitor periodically senses the inflation pressure of the tire at the same predetermined time intervals as periodically transmits the pressure transmitting signal.

6. The remote tire pressure monitoring system as set forth in claim 4, wherein in the periodic transmission mode, if the tire monitor receives the acknowledge signal transmitted by the transmitter, the tire monitor shifts the operation thereof from the periodic transmission mode to the power saving mode.

7. The remote tire pressure monitoring system as set forth in claim 4, wherein in the power saving mode, the tire monitor cyclically transmits the pressure transmitting signal, when the determined change in the inflation pressure of the tire is greater than or equal to the predetermined threshold, at shorter predetermined time intervals than in the periodic transmission mode.

8. The remote tire pressure monitoring system as set forth in claim 4, further comprising a spare tire monitor mounted to a spare tire of the vehicle, wherein the spare tire monitor is so located on the vehicle that the spare tire monitor cannot receive the acknowledge signal transmitted by the transmitter.

9. The remote tire pressure monitoring system as set forth in claim 8, wherein the spare tire monitor is configured to operate in a long-period periodic transmission mode, in which the spare tire monitor senses inflation pressure of the spare tire and periodically transmits a pressure transmitting signal containing information on the sensed inflation pressure of the spare tire at longer predetermined time intervals than the tire monitor periodically transmits the pressure transmitting signal containing information on the inflation pressure of the tire in the periodic transmission mode.

10. The remote tire pressure monitoring system as set forth in claim 9, wherein in the periodic transmission mode, if the tire monitor has not received the acknowledge signal from the transmitter for a predetermined time period, the tire monitor shifts the operation thereof from the periodic transmission mode to the long-period periodic transmission mode in which the spare tire monitor operates.

11. The remote tire pressure monitoring system as set forth in claim 9, further comprising a running detector that is operatively connected to the tire monitor and works to detect if the vehicle is running or at a standstill,
   wherein when the running detector detects the vehicle being at a standstill, the tire monitor operates in the long-period periodic transmission mode, in which the spare tire monitor operates, and the operation of the tire monitor is inhibited from being shifted from the long-period periodic transmission mode to any of the power saving mode and the periodic transmission mode until the running detector detects the vehicle running.

12. The remote tire pressure monitoring system as set forth in claim 1, wherein
   the pressure transmitting signal transmitted by the tire monitor further contains a specific code,
   in response to receipt of the pressure transmitting signal by the receiver, the controller generates an acknowledge code based on the specific code contained in the pressure transmitting signal and controls the transmitter to transmit the acknowledge signal that contains the generated acknowledge code, and
   upon receipt of the acknowledge signal, the tire monitor recognizes, based on the acknowledge code contained in the acknowledge signal, that the pressure transmitting signal transmitted thereby has certainly been received by the receiver.

13. The remote tire pressure monitoring system as set forth in claim 12, wherein the specific code contained in the pressure transmitting signal is an identification code unique to the tire monitor.

14. The remote tire pressure monitoring system as set forth in claim 13, wherein the controller generates the acknowledge code as being identical to the identification code.

15. The remote tire pressure monitoring system as set forth in claim 13, wherein the controller generates the acknowledge code as being identical to part of the identification code.

16. The remote tire pressure monitoring system as set forth in claim 13, wherein the controller generates the acknowledge code by using an operational expression that defines a definite relationship between the identification code and the acknowledge code.

17. The remote tire pressure monitoring system as set forth in claim 13, wherein the controller generates the acknowledge code by using an operational expression that defines a definite relationship between part of the identification code and the acknowledge code.

18. The remote tire pressure monitoring system as set forth in claim 12, wherein the specific code contained in the pressure transmitting signal is a random bit string.

19. The remote tire pressure monitoring system as set forth in claim 18, wherein the controller generates the acknowledge code as being identical to the random bit string.

20. The remote tire pressure monitoring system as set forth in claim 18, wherein the controller generates the acknowledge code as being identical to part of the random bit string.

21. The remote tire pressure monitoring system as set forth in claim 18, wherein the controller generates the acknowledge code by using an operational expression that defines a definite relationship between the random bit string and the acknowledge code.

22. The remote tire pressure monitoring system as set forth in claim 18, wherein the controller generates the acknowledge code by using an operational expression that defines a definite relationship between part of the random bit string and the acknowledge code.

23. The remote tire pressure monitoring system as set forth in claim 12, wherein the controller generates the acknowledge code as being an error-correcting code of the specific code contained in the pressure transmitting signal.

24. The remote tire pressure monitoring system as set forth in claim 1, wherein all of the receiver, the transmitter, and the controller are provided on a body of the vehicle.

25. The remote tire pressure monitoring system as set forth in claim 24, wherein the receiver and the controller are integrated into a single device.

* * * * *